US009215383B2

(12) United States Patent
Milnes et al.

(10) Patent No.: US 9,215,383 B2
(45) Date of Patent: Dec. 15, 2015

(54) SYSTEM FOR ENHANCING VIDEO FROM A MOBILE CAMERA

(75) Inventors: Kenneth A. Milnes, Fremont, CA (US); Stanley K. Honey, Palo Alto, CA (US); James O. McGuffin, Saratoga, CA (US); Richard H. Cavallaro, Mountain View, CA (US); John R. Borton, Los Gatos, CA (US); Rand Pendleton, Santa Cruz, CA (US)

(73) Assignee: SPORTSVISION, INC., Chicago, IL (US)

(*) Notice: Subject to any disclaimer, the term of this patent is extended or adjusted under 35 U.S.C. 154(b) by 605 days.

(21) Appl. No.: 13/551,997

(22) Filed: Jul. 18, 2012

(65) Prior Publication Data

US 2013/0033598 A1 Feb. 7, 2013

Related U.S. Application Data

(60) Provisional application No. 61/515,836, filed on Aug. 5, 2011.

(51) Int. Cl.
*H04N 7/18* (2006.01)
*H04N 5/272* (2006.01)
*G01S 19/49* (2010.01)
*G01S 19/53* (2010.01)
*G01C 21/20* (2006.01)

(52) U.S. Cl.
CPC .............. *H04N 5/272* (2013.01); *G01C 21/203* (2013.01); *G01S 19/49* (2013.01); *G01S 19/53* (2013.01); *H04N 7/185* (2013.01)

(58) Field of Classification Search
CPC ......... G08G 1/20; G08G 1/205; G01C 11/02; G01C 11/025; A63B 2220/05; A63B 2220/10; A63B 2220/12; A63B 2220/13; A63B 2220/20; A63B 2220/806; A63B 2220/83

USPC .............. 348/144, 157; 340/988–991, 995.1, 340/995.14, 995.24, 995.28, 539.13; 701/468, 482
See application file for complete search history.

(56) References Cited

U.S. PATENT DOCUMENTS 3,580,993 A 5/1971 Sandorf
3,595,987 A 7/1971 Vlahos
(Continued)

FOREIGN PATENT DOCUMENTS

DE 4101156 1/1991
FR 2 794 524 12/2000
(Continued)

OTHER PUBLICATIONS

PCT International Search Report dated Oct. 23, 2012, PCT Patent Application No. PCT/US2012/048872.
(Continued)

*Primary Examiner* — Victor Kostak
(74) *Attorney, Agent, or Firm* — Vierra Magen Marcus LLP

(57) ABSTRACT

An automated system is configured to enhance live video in real time by adding virtual graphics to imagery obtained from a moving camera, where the added virtual graphics can represent real yet not visible attributes such as wind speed and direction and non-real attributes such as lines indicative of racing advantages. The displayed positions of the virtual graphics are dependent on sensor measurements of the locations and/or attitudes in a real world 3D coordinate system of objects and of the movable camera The displayed positions of the virtual graphics are functions of corresponding locations in the real world 3D coordinate system.

26 Claims, 14 Drawing Sheets

(56) References Cited

U.S. PATENT DOCUMENTS

| | | | |
|---|---|---|---|
| 3,840,699 A | 10/1974 | Bowerman | |
| 3,973,239 A | 8/1976 | Kakumoto | |
| 4,064,528 A | 12/1977 | Bowerman | |
| 4,067,015 A | 1/1978 | Mogavero | |
| 4,084,184 A | 4/1978 | Crain | |
| 4,100,569 A | 7/1978 | Vlahos | |
| 4,179,704 A | 12/1979 | Moore | |
| 4,319,266 A | 3/1982 | Bannister | |
| 4,344,085 A | 8/1982 | Vlahos | |
| 4,386,363 A | 5/1983 | Morrison | |
| 4,409,611 A | 10/1983 | Vlahos | |
| 4,420,770 A | 12/1983 | Rahman | |
| 4,521,196 A | 6/1985 | Briard | |
| 4,589,013 A | 5/1986 | Vlahos | |
| 4,591,897 A | 5/1986 | Edelson | |
| 4,612,666 A | 9/1986 | King | |
| 4,625,231 A | 11/1986 | Vlahos | |
| 4,674,125 A | 6/1987 | Carlson | |
| 4,700,306 A | 10/1987 | Wallmander | |
| 4,811,084 A | 3/1989 | Belmares-Sarabia | |
| 4,817,171 A | 3/1989 | Stentiford | |
| 4,855,822 A | 8/1989 | Narendra | |
| 4,924,507 A | 5/1990 | Chao | |
| 4,950,050 A | 8/1990 | Pernick | |
| 4,970,666 A | 11/1990 | Welsh | |
| 4,975,770 A | 12/1990 | Troxell | |
| 4,999,709 A | 3/1991 | Yamazaki | |
| 5,063,603 A | 11/1991 | Burt | |
| 5,100,925 A | 3/1992 | Watson | |
| 5,150,895 A | 9/1992 | Berger | |
| 5,179,421 A | 1/1993 | Parker | |
| 5,184,820 A | 2/1993 | Keating | |
| 5,191,341 A * | 3/1993 | Gouard et al. | 342/456 |
| 5,202,829 A * | 4/1993 | Geier | 701/470 |
| 5,207,720 A | 5/1993 | Shepherd | |
| 5,249,039 A | 9/1993 | Chaplin | |
| 5,264,933 A | 11/1993 | Rosser | |
| 5,305,107 A | 4/1994 | Gale | |
| 5,313,304 A | 5/1994 | Chaplin | |
| 5,343,252 A | 8/1994 | Dadourian | |
| 5,353,392 A | 10/1994 | Luquet | |
| 5,398,075 A | 3/1995 | Freytag | |
| 5,423,549 A | 6/1995 | Englmeier | |
| 5,436,672 A | 7/1995 | Medioni | |
| 5,452,262 A * | 9/1995 | Hagerty | 367/6 |
| 5,459,793 A | 10/1995 | Naoi | |
| 5,465,308 A | 11/1995 | Hutcheson | |
| 5,469,536 A | 11/1995 | Blank | |
| 5,488,675 A | 1/1996 | Hanna | |
| 5,491,517 A | 2/1996 | Kreitman | |
| 5,517,205 A | 5/1996 | van Heyningen | |
| 5,543,856 A | 8/1996 | Rosser | |
| 5,564,698 A | 10/1996 | Honey | |
| 5,566,251 A | 10/1996 | Hanna | |
| 5,592,236 A | 1/1997 | Rosenbaum | |
| 5,610,653 A | 3/1997 | Abecassis | |
| 5,627,915 A | 5/1997 | Rosser | |
| 5,642,285 A * | 6/1997 | Woo et al. | 701/470 |
| 5,668,629 A | 9/1997 | Parker | |
| 5,731,788 A * | 3/1998 | Reeds | 342/357.57 |
| 5,742,521 A | 4/1998 | Ellenby | |
| 5,808,695 A | 9/1998 | Rosser | |
| 5,862,517 A | 1/1999 | Honey | |
| 5,881,321 A | 3/1999 | Kivolowitz | |
| 5,892,554 A | 4/1999 | DiCicco | |
| 5,903,317 A | 5/1999 | Sharir | |
| 5,912,700 A | 6/1999 | Honey | |
| 5,917,553 A | 6/1999 | Honey | |
| 5,923,365 A | 7/1999 | Tamir | |
| 5,953,076 A | 9/1999 | Astle | |
| 5,977,960 A | 11/1999 | Nally | |
| 6,014,472 A | 1/2000 | Minami | |
| 6,031,545 A | 2/2000 | Ellenby | |
| 6,037,936 A | 3/2000 | Ellenby | |
| 6,072,571 A * | 6/2000 | Houlberg | 356/139.04 |
| 6,100,925 A | 8/2000 | Rosser | |
| 6,122,013 A | 9/2000 | Tamir | |
| 6,154,174 A | 11/2000 | Snider | |
| 6,191,825 B1 | 2/2001 | Sprogis | |
| 6,201,579 B1 | 3/2001 | Tamir | |
| 6,208,386 B1 | 3/2001 | Wilf | |
| 6,229,550 B1 | 5/2001 | Gloudemans | |
| 6,252,632 B1 | 6/2001 | Cavallaro | |
| 6,271,890 B1 | 8/2001 | Tamir | |
| 6,292,227 B1 | 9/2001 | Wilf | |
| 6,297,853 B1 | 10/2001 | Sharir | |
| 6,304,298 B1 | 10/2001 | Steinberg | |
| 6,307,556 B1 | 10/2001 | Ellenby | |
| 6,354,132 B1 | 3/2002 | Van Heyningen | |
| 6,380,933 B1 | 4/2002 | Sharir | |
| 6,384,871 B1 | 5/2002 | Wilf | |
| 6,438,508 B2 | 8/2002 | Tamir | |
| 6,559,884 B1 | 5/2003 | Tamir | |
| 6,567,038 B1 | 5/2003 | Granot | |
| 6,690,370 B2 | 2/2004 | Ellenby | |
| 6,714,240 B1 * | 3/2004 | Caswell | 348/241 |
| 6,728,637 B2 | 4/2004 | Ford | |
| 6,738,009 B1 | 5/2004 | Tsunoda | |
| 6,744,403 B2 | 6/2004 | Milnes | |
| 6,864,886 B1 | 3/2005 | Cavallaro | |
| 6,965,297 B1 | 11/2005 | Sandahl | |
| 7,075,556 B1 | 7/2006 | Meier | |
| 7,313,252 B2 | 12/2007 | Matei et al. | |
| 7,341,530 B2 | 3/2008 | Cavallaro | |
| 7,565,155 B2 * | 7/2009 | Sheha et al. | 455/456.1 |
| 7,732,769 B2 | 6/2010 | Snider et al. | |
| 7,773,116 B1 * | 8/2010 | Stevens | 348/208.4 |
| 7,916,138 B2 | 3/2011 | John et al. | |
| 7,934,983 B1 * | 5/2011 | Eisner | 463/6 |
| 7,948,518 B1 * | 5/2011 | Baker et al. | 348/157 |
| 2004/0006424 A1 | 1/2004 | Joyce | |
| 2004/0224740 A1 * | 11/2004 | Ball et al. | 463/6 |
| 2006/0215027 A1 * | 9/2006 | Nonoyama et al. | 348/144 |
| 2008/0278314 A1 * | 11/2008 | Miller et al. | 340/539.13 |
| 2009/0040305 A1 * | 2/2009 | Krajec | 348/144 |
| 2010/0310121 A1 * | 12/2010 | Stanfill et al. | 382/103 |
| 2011/0007150 A1 | 1/2011 | Johnson | |
| 2013/0027555 A1 * | 1/2013 | Meadow | 348/144 |
| 2013/0054138 A1 * | 2/2013 | Clark | 701/468 |

FOREIGN PATENT DOCUMENTS

| | | |
|---|---|---|
| SU | 1659078 | 6/1991 |
| WO | WO95/10915 | 4/1995 |
| WO | WO95/10919 | 4/1995 |

OTHER PUBLICATIONS

PCT Written Opinion of the International Searching Authority dated Oct. 23, 2012, PCT Patent Application No. PCT/US2012/048872.

Ann Eisenberg, "The America's Cup, Translated for Television," The New York Times, Jun. 18, 2011, pp. 1/3-3/3, XP002684843, URL: http://www.nytimes.com/2011106/19/business/19novel.html?_r=0#.

Replay 2000—The Ultimate Workstation for Sport Commentators and Producers, Orad Hi-Tec Systems, Apr. 1995.

SailTrack, GPS Tracking System for Animated Graphics Broadcast Coverage of the America's Cup Races, 1992.

SailTrack Technical Overview, 1992.

Sail Viz Software Documentation, 1992.

Airins Georeferencing and Orientation System, iXSea, www.ixsea.com, Jan. 2011.

Cineflex V14 HD, Gyro-Stabilized Airborne Camera Systems, Axsys Technologies, General Dynamics Advanced Information Systems, www.axsys.com, Apr. 2009.

Valdes, "How the Predator UAV Works," http://science.howstuffworks.com/predator.htm/printable, Jan. 2007.

Vitrual Eye Sailing, Virtual Eye, Animation Research Ltd., Nov. 2009.

European Response to Office Action dated Sep. 22, 2014, European Patent Application No. 12754115.9.

* cited by examiner

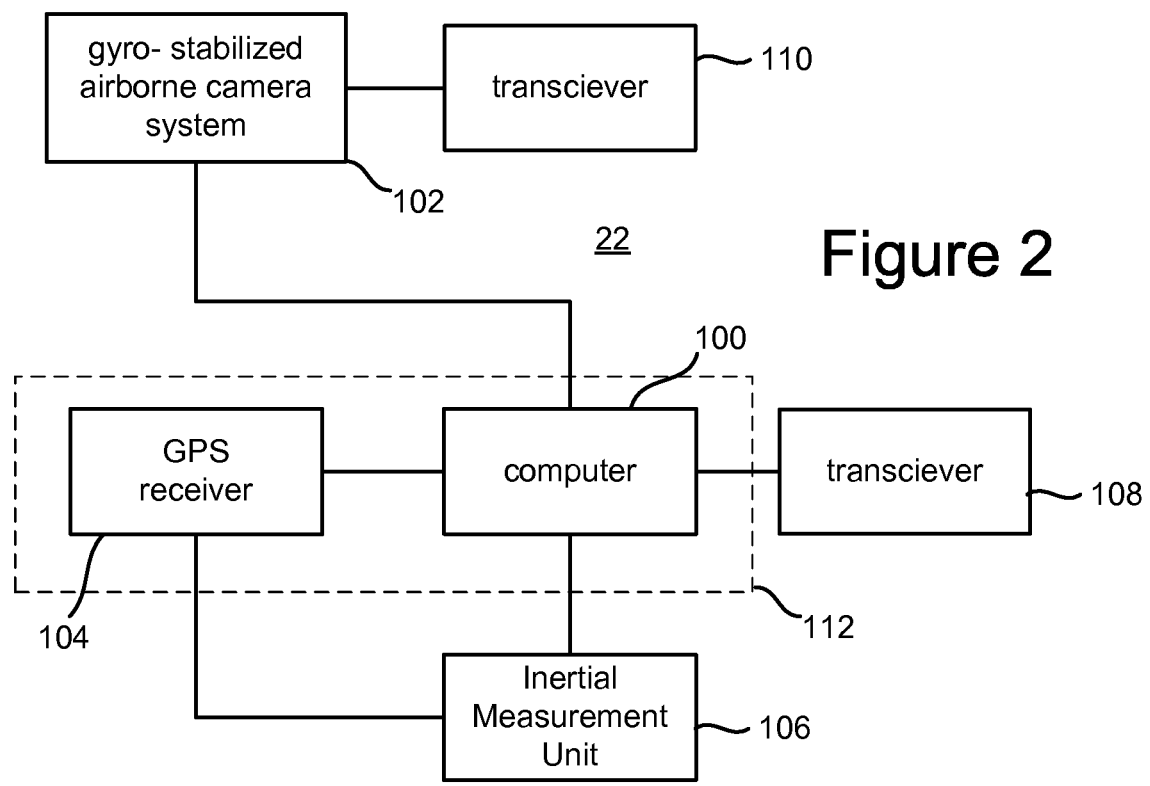

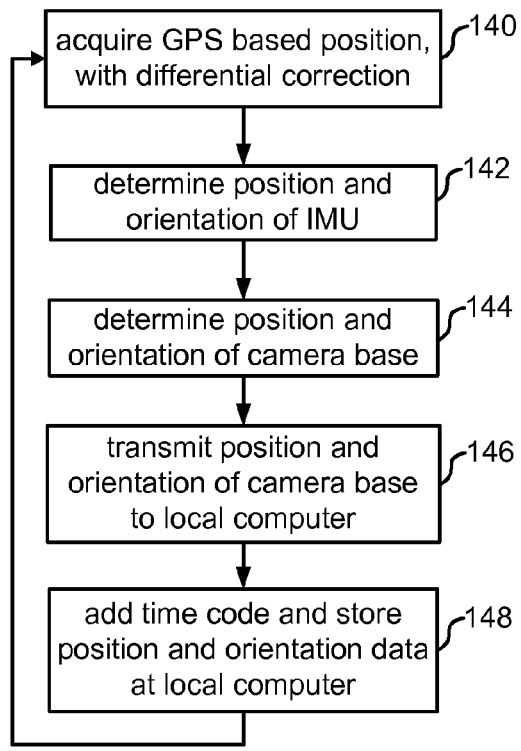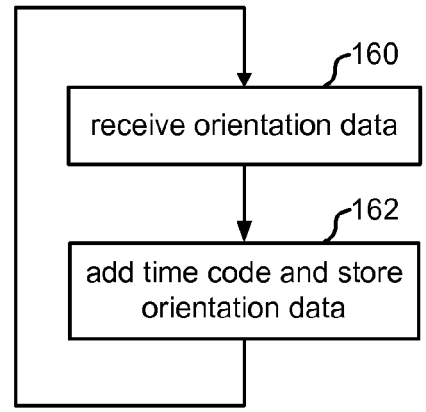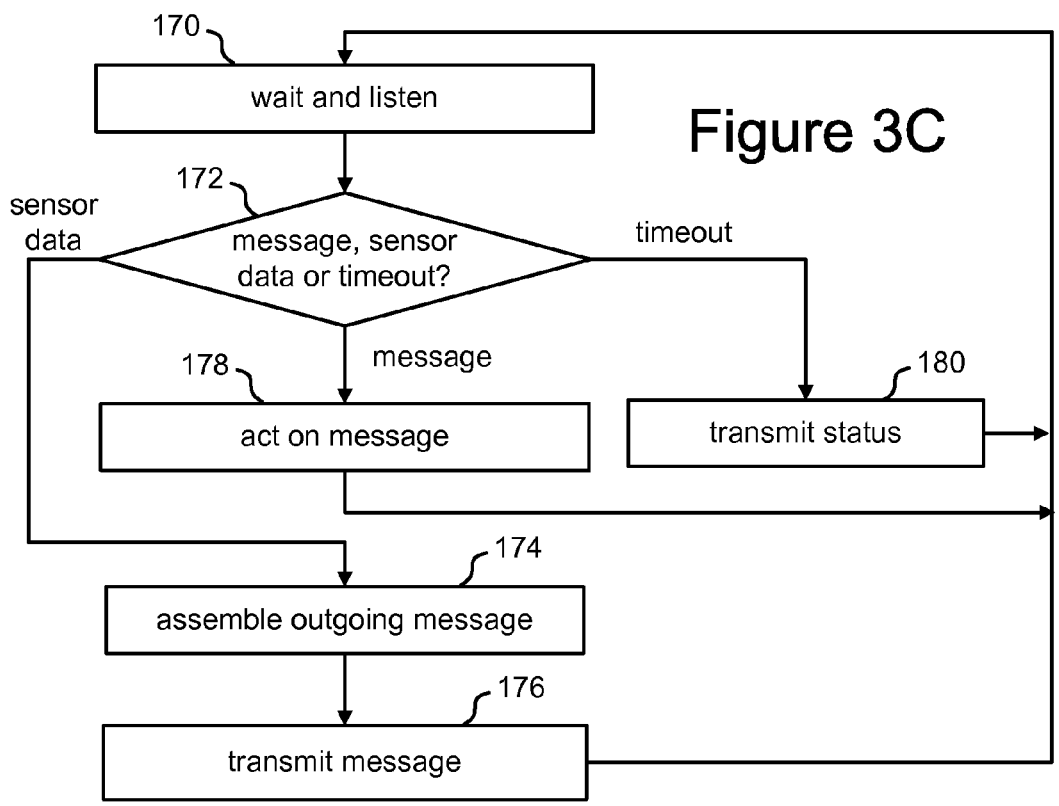

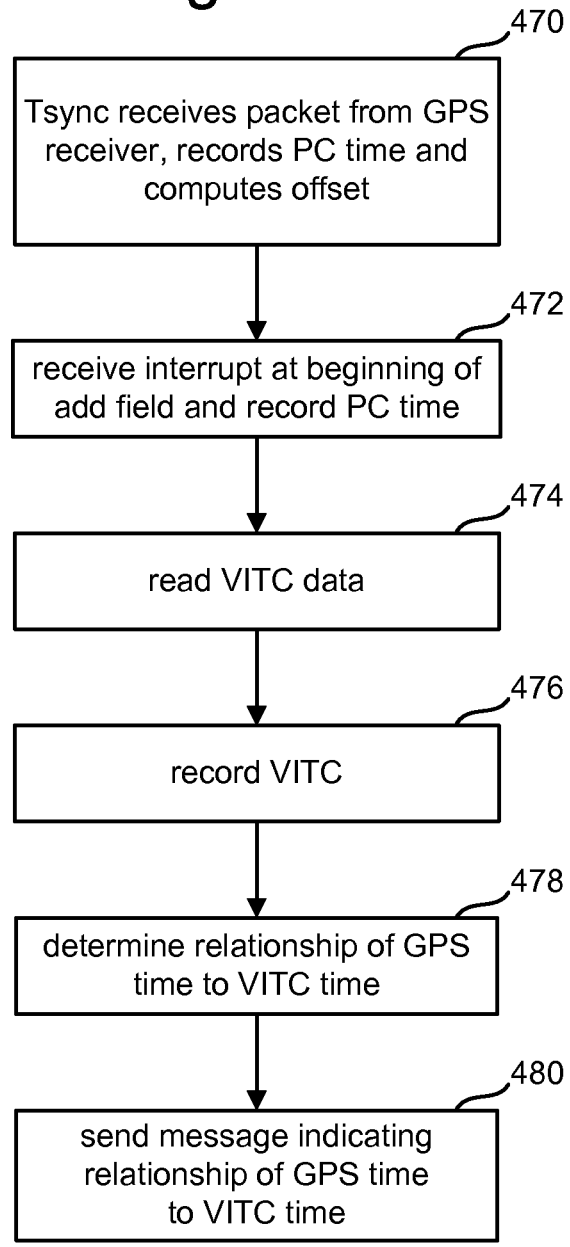

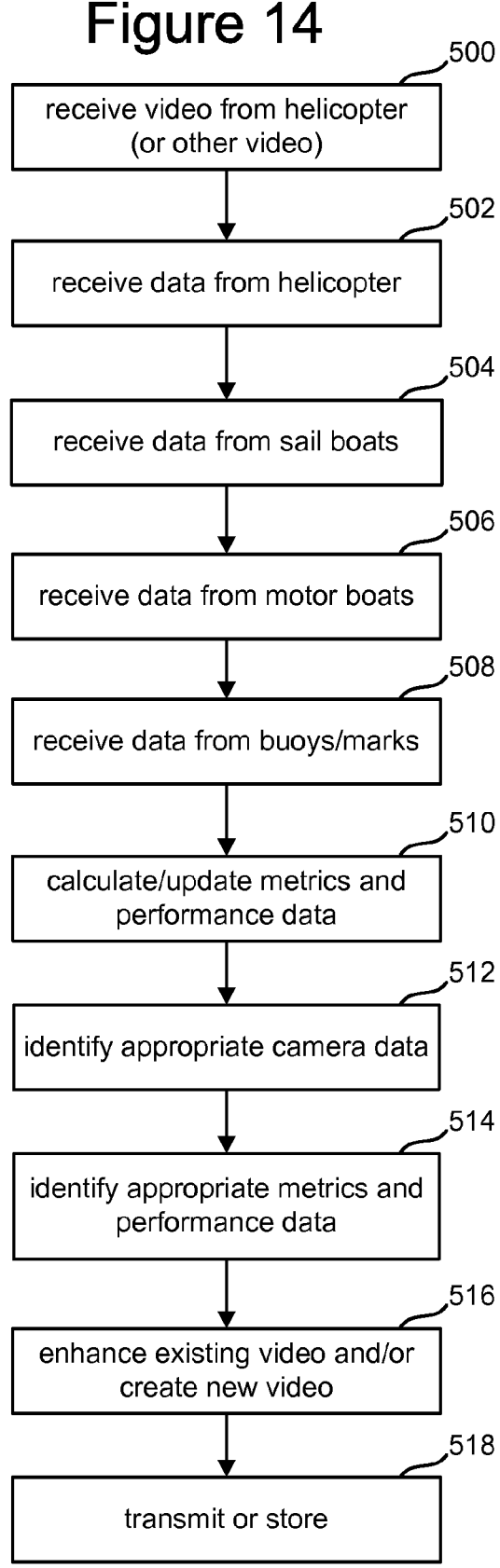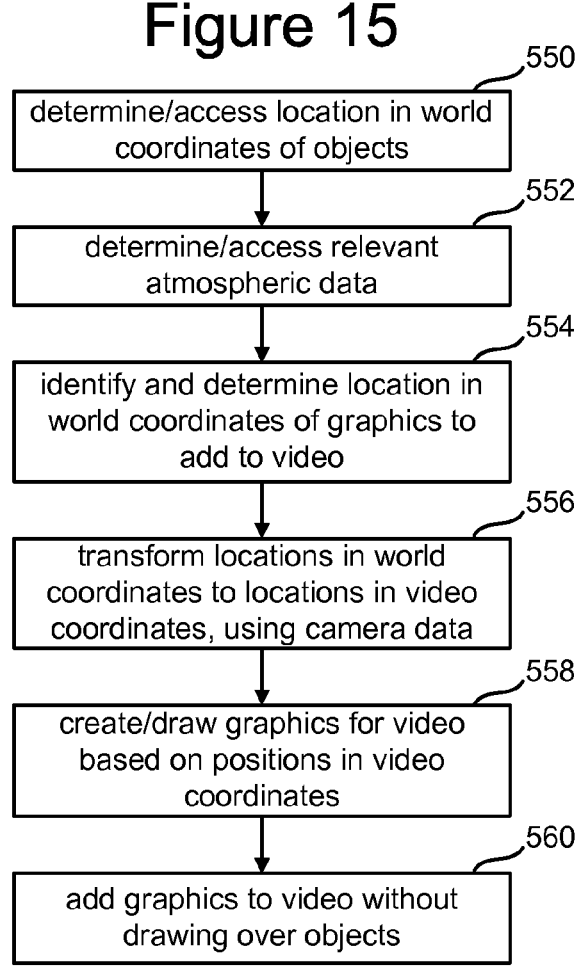

SYSTEM FOR ENHANCING VIDEO FROM A MOBILE CAMERA

This application claims priority to provisional application 61/515,836, filed on Aug. 5, 2011, incorporated herein by reference in its entirety.

BACKGROUND OF THE INVENTION

1. Field

The present invention is directed to a system for enhancing video.

2. Description of the Related Art

Some events (e.g., sporting events or other types of events) are difficult to follow on television. For example, participants or objects used in the events are difficult to see or the area that an event is taking place in cannot be properly viewed on television.

In other instances, the skills or talent of a participant are not easily appreciated by the lay person. Spectators would enjoy the event better if they understood the intricacies of what was happening in the event.

In the past, broadcasters have deployed a varied repertoire of technologies to highlight various aspects of events for viewers. However, many of the technologies utilized by broadcasters are limited due to various constraints. For example, some broadcasters have inserted virtual graphics into video during post production in order to show the skills of star athletes. While such enhanced video is interesting, many viewers prefer to see the enhancements made to video during the event.

Broadcasters have also begun inserting virtual graphics into live video. However, systems that insert graphics into live video have not provided the full degree of freedom that some producers would like.

BRIEF DESCRIPTION OF THE DRAWINGS

FIG. 2 is a block diagram of one embodiment of the electronics associated with the movable camera which, in one example, are located on an aircraft.

FIGS. 3A-C are flow charts describing example processes performed by the electronics associated with the movable camera.

FIG. 13 is a flow chart depicting one embodiment of a process for synchronizing video and data.

FIG. 14 is a flow chart depicting one embodiment of a process performed at the production center.

FIG. 15 is a flow chart depicting one embodiment of a process for enhancing video.

DETAILED DESCRIPTION

A system is proposed that can enhance video captured by a mobile camera capable of changing location and orientation. In one embodiment, the camera is mounted on a aircraft (e.g., helicopter, airplane, balloon, glider, etc.) so that the camera can be moved anywhere the airplane can fly. In one example implementation, the camera is mounted such that its orientation can be changed (e.g., panned, titled, rolled) with respect to the aircraft (which can also change its orientation). Sensors are used to automatically determine an instantaneous location and orientation of the camera. Various moving objects within the field of view of the camera can also be equipped with sensors to measure location and orientation. The information from the above-described sensors is used to create graphics and add those graphics to video from the camera in proper perspective, in real time. The concept of real time can include small delays for processing, but is not meant to include post processing for the insertion of a graphic into the video of an event after the event is over.

In one example implementation, the graphics are created as a function of the location and/or orientation of one or more of the moving objects. The graphics can also be created as a function of one or more atmospheric conditions (e.g., wind speed, wind direction, humidity, precipitation, temperature, etc.). The location and/or orientation of the camera on the aircraft is used to transform the graphic to an image in the video from the camera.

Figure 1:
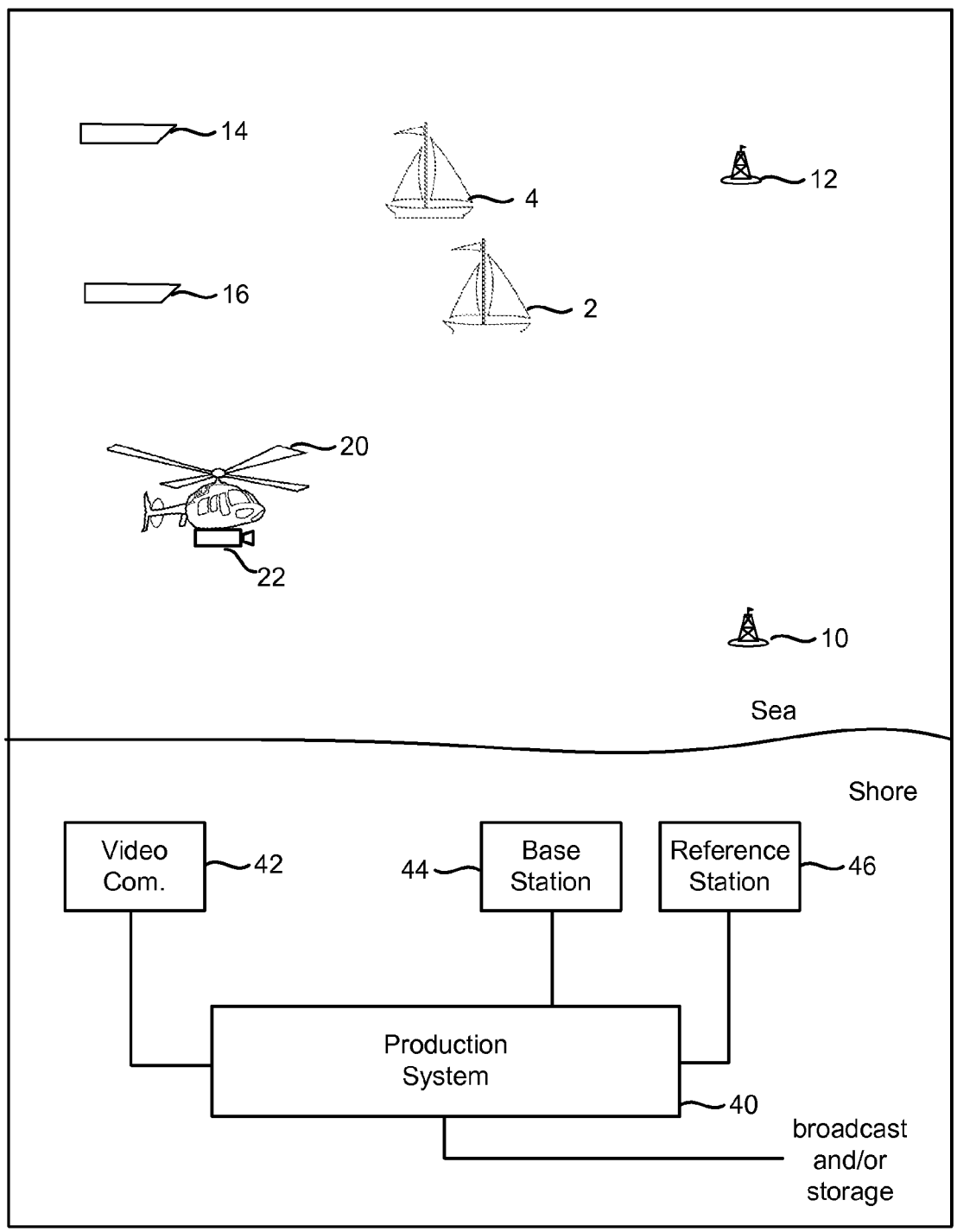
FIG. 1 is a block diagram depicting a system for enhancing video.

FIG. 1 is a block diagram depicting one example embodiment of a system for enhancing video. Although the example described with respect to FIG. 1 pertains to racing sailboats, the technology described herein can be used with other types of events. Sailboat racing is only provided as one example.

FIG. 1 depicts a system being using in a sailboat race with part of the system being deployed at sea and part of the system being deployed on shore. In the Sea are sailboat 2 and sailboat 4, which involved in a race. The race course includes buoy 10 and buoy 12, both of which serve as marks. There can be more or less than two marks, be more or less than two sailboats. In some races, the sailboats will sail around the buoys. Power boat 14 and power boat 16 can serve to delineate a start line between the two power boats or a finish line between the two power boats. Additionally, power boats can be used for umpires. Although FIG. 1 shows two power boats, a race may include more than two power boats. FIG. 1 also shows helicopter 20 with camera apparatus 22 mounted to helicopter 20. In other embodiments, different types of aircraft, other than a helicopter, can also be used with camera apparatus 22. In one embodiment, helicopter 20 can fly anywhere above the race thereby making camera apparatus 22 movable such that camera apparatus 22 can change locations and be unrestrained in its ability to move locations within the restricted air space above (or near) the race (or subset of the restricted air space above the race).

On the shore there is a Production System 40 which is in communication with a Video Communication system 42 (or multiple Video Communication systems), Base Station 44 (or multiple Base Stations) and Reference Station 46 (or multiple Reference Stations). Production system 40 will receive video from camera apparatus 22, enhance the video as described herein, and output the video for broadcast and/or storage.

In one embodiment, camera apparatus 22 includes various electronics to automatically sense and determine, in real time, the location and orientation of the video camera capturing video the sailboat race. Sailboat 2, sailboat 4, buoy 10, buoy 12, power boat 14 and power boat 16 also include electronics for automatically determining the location and orientation, in real time, of the respective objects. Note that although buoy 10 and buoy 12 may be anchored to the bottom of the sea (or anchored to another object), the buoys will be able to move due to the tide. In some embodiments, the system will not include orientation sensing for buoys 10 and 12.

The video from camera apparatus 22 is wirelessly transmitted to Video Communication system 42 using means known in the art. Upon being received at Video Communication system 42, the video is provided to Production System 40, where a time stamp will be added to the video and the video will subsequently be enhanced, as described herein. In another embodiment, the time code can be added by Video Communication system 42 prior to transmission to Production System 40.

Each of sailboat 2, sailboat 4, buoy 10, buoy 12, power boat 14, power boat 16 and camera apparatus 22 wirelessly transmit their sensor data (location and/or orientation sensor data) to Base Station 44. Any suitable means known in the art for wireless transmission of this type of data can be used. In one embodiment, the data is communicated using a TDMA protocol in the 2.5 GHz band. In one embodiment, Ethernet can also be used. Base Station 44 can transfer the received information to Production System 40 so that the video from camera apparatus 22 can be enhanced based on the received sensor data. Additionally, Production System 40 can also provide information to Base Station 44 for transmission to each of the moving objects (e.g., boats, buoys and helicopter) at sea.

In one embodiment, location sensing is performed using the Global Positioning System (GPS). Reference station 46 includes a GPS Receiver, and is surveyed with accuracy to determine its precise location. Reference station 46 will receive GPS information from GPS satellites and determine differential GPS error correction information, as is known in the art. This differential GPS error correction information is communicated from Reference Station 46 to Base Station 44 via Production System 40 (or directly from Reference Station 46 to Base Station 44) for retransmission to the GPS Receivers (or accompanying computers) on sailboat 2, sailboat 4, buoy 10, buoy 12, power boat 14, power boat 16 and camera apparatus 22. In another embodiment, the system can use pseudolites to provide additional data to the GPS Receivers instead of or in combination with differential GPS error correction information.

In operation, the various sensors on the objects described above will be used to determine location and orientation of the various components described above. Based on this location and orientation information, various metrics, performance information and statistics can be determined. In addition, based on that location and orientation information, one or more graphics are created and inserted into the video captured by camera apparatus 22. The insertion of the graphics into the video is performed by Production System 40. More details will be provided below.

FIG. 2 is a block diagram describing the components of camera apparatus 22. FIG. 2 shows computer 100 in communication with gyro-stabilized airborne camera system 102, GPS Receiver 104, inertial measurement unit 106 (IMU) and transceiver 108. Computer 100 and GPS Receiver 104 are located in a waterproof box 112. Gyro-stabilized airborne camera system 102 [hereinafter referred to as camera system 102] is also in communication with transceiver 110, which sends video from camera system 102 to Video Communication system 42. Transceiver 108 is used to communicate with Base Station 44 in a manner similar to Ethernet (e.g., similar to how WiFi is implemented).

Camera system 102 includes a high definition camera mounted to a camera base such that the camera can move with respect to the base along multiple axes. The camera base is mounted to the aircraft such that the camera base will not move with respect to the aircraft and the camera itself will move with respect to the camera base. Sensors are used to detect movement of the camera and provide information on orientation of the camera to computer 100. One example of a suitable gyro-stabilized airborne camera system includes the Cineflex V14HD gyro-stabilized airborne camera system by Axsys Technologies, of General Dynamics Advanced Information Systems. Camera system 102 includes five axes of motion, remote steering and fine correctional movements for stabilization to a sub-pixel level. In one implementation, the capture device is a Sony HDC-1500 1080p professional broadcast camera. This camera has three CCDs and outputs 1080p high definition video at an aspect ratio of 16:9. The camera is mounted such that it can move along two axes with respect to the base. These two axes will be referred to as an inner ring and an outer ring.

The output of camera system 102 provides the following information to computer 100: pan (also called azimuth) of the outer ring (referred to below as $Pan_{Outer}$), tilt (also called elevation) of the outer ring (referred to below as $Tilt_{Outer}$), pan of the inner ring (referred to below as $Pan_{Inner}$), tilt of the inner ring (referred to below as $Tilt_{Inner}$), roll (referred to below as $Roll_{Inner}$), zoom (a voltage level indicating how far the camera lens is zoomed), a measured focus value (a voltage indicating the position of the focus ring), and a measured value of the 2× Extender (e.g., an on/off value indicating whether the 2× Extender is turned on or off). This data received from camera system 102 provides information to determine the orientation of the camera with respect to the camera base.

GPS Receiver 104 is a real time kinematic (RTK) GPS Receiver from NovAtel, Inc. (www.novatel.com). GPS Receiver 104 will receive signals from multiple GPS satellites to determine a location of the GPS Receiver. Differential GPS error correction information will be used to reduce error in the GPS derived location. That information is provided to computer 100 and/or to IMU 106.

IMU 106 automatically detects its orientation. One suitable IMU 106 is the AIRINS Geo-referencing and Orientation System from IXSEA. In one embodiment, IMU 106 will include 6 axes: 3 closed loop fiberoptic gyros, and 3 accelerometers. Other forms of an IMU can be also used. IMU 106 can determine true heading in degrees and roll/pitch in degrees. In one embodiment, IMU 106 is programmed by inputting the relative difference in location between IMU 106 and GPS Receiver 104. In this manner IMU 106 can receive the GPS derived location from GPS Receiver 104 and determine its own location based on and as a function of the location of GPS Receiver 104. Similarly, IMU 106 can be programmed by inputting the difference in location between IMU 106 and the camera base of camera system 102 so that IMU 106 can also calculate the location of the camera base of camera system 102. This location information can be provided to computer 100 for transmission to production center 40 via transceiver 108. Computer 100, or a computer in Production System 40, can be programmed to know the difference in orientation between IMU 106 and the camera base of camera system 102. Therefore, when IMU 106 reports its orientation information, computer 104 (or another computer in Production System 40) can easily translate that orientation information to the orientation of camera base 102. Note that the locations determined by GPS Receiver 104 and IMU 106 are in world space.

FIGS. 3A-3C describe the operation of the components of FIG. 2. More specifically, FIG. 3A is a flow chart describing the automatic process for acquiring the camera's location data. In step 140 of FIG. 3A, the system will acquire a GPS-based location with differential correction using GPS Receiver 104. That information will be provided from GPS Receiver 104 to computer 100 and IMU 106. In step 142, IMU 206 will determine its location and orientation. The orientation is determined using the sensors within the IMU 106. The location of IMU 106 is determined by using the location received from GPS Receiver 104. Determining the location of the IMU with respect to the GPS Receiver 104 is known as calculating the lever arm of IMU 106. As mentioned above, the location of IMU 106 has a functional relationship to the location of GPS Receiver. By functional relationship it is meant that the relationship of the two locations can be defined using mathematics. Similarly, the location of IMU 106 has a functional relationship to the location of camera base of camera system 102.

In step 144, IMU 106 will determine the location and orientation of the camera base of camera system 102, as discussed above. In step 146, IMU 106 will transmit the location and orientation of the camera base to computer 100. In step 148 computer 100 will add time code to the location and orientation information received from IMU 106. That location and orientation information, with the time code, will be stored by computer 100. In other embodiments, the time code can be added to the data by Production System 40, or another component of the overall system. The process of FIG. 3A is automatically and continually repeated during operation of the system of FIG. 1.

FIG. 3B depicts a flow chart describing a process for automatically receiving data from camera system 102. In step 160, the information (described above) outputted from camera system 102 is provided to computer 100. In step 162, computer 100 will add time code to this data and store it. In other embodiments, the time code can be added to the data by Production System 40. The process of FIG. 3B will be repeated automatically and continuously during operation of the system of FIG. 1.

FIG. 3C is a flow chart describing one embodiment performed automatically by transceiver 108. In step 170, transceiver 108 will listen for an event that will cause it to act. For example, a message can be received from Base Station 44, sensor data (resulting from the processes of FIGS. 3A and 3B) can be ready to be sent to Base Station 44 or a time out has occurred (indicating that status information needs to be transmitted). Whenever new sensor data is ready to be sent (step 172), transceiver 108 will assemble an outgoing message that includes the position information (step 174). That message will then be transmitted (step 176) to Base Station 44 and the process will loop back to step 170. If a message is received at transceiver 108 (step 172), then the system of FIG. 2 will act on that message. For example, differential GPS error correction information can be sent once per second. The received differential GPS error correction information is provided from transceiver 108 to GPS Receiver 104 (via computer 100). In another embodiment, computer 100 applies the differential GPS error correction information to information from GPS Receiver 104. Other types of messages include commands to the hardware of FIG. 2, messages to the hardware of FIG. 2, etc. After acting on the message at step 178, the process loops back to step 170 and waits for the next event. If a time out has occurred (step 170), then transceiver 108 will transmit status information for the system of FIG. 2. Examples of status information include power supply voltage, temperature, faults (if any), etc. Note that transceiver 110 will continually send video from camera system 102 to Video Communication system 42.

Figure 4:
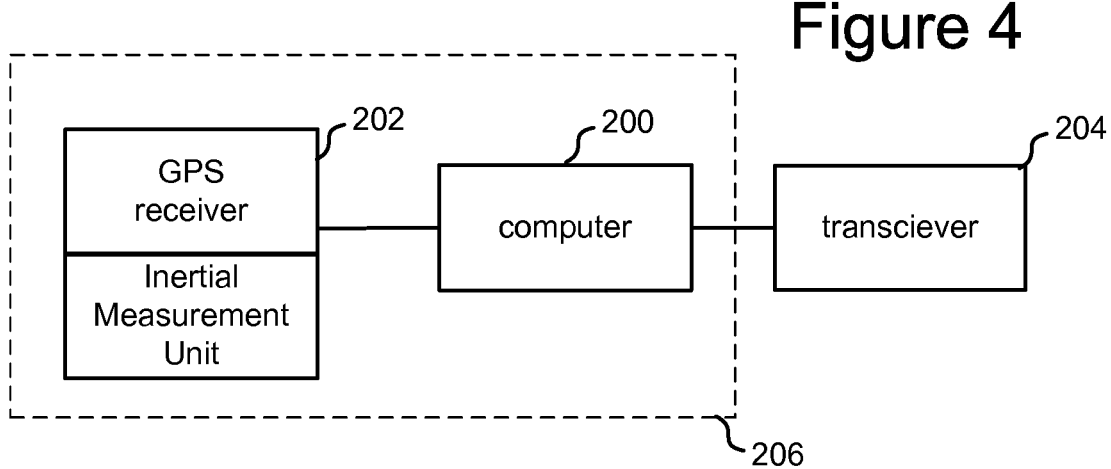
FIG. 4 is a block diagram of one embodiment of the electronics associated with the movable object.

FIG. 4 is a block diagram depicting one embodiment of the components located on sailboats (e.g., sailboat 2, sailboat 4, or another sailboat) or other objects. FIG. 4 shows computer 200 in communication with integrated GPS Receiver/inertial measurement unit 202 [hereinafter "GPS/IMU 202"] and transceiver 404. Computer 200 and GPS/IMU 202 are housed in a water tight case. GPS/IMU 202 is used to determine the GPS derived location of the sailboat and the orientation of the sailboat (e.g., heading, roll/pitch), and will use differential GPS error correction information, as described above. The location and orientation information from GPS/IMU 202 is provided to computer 200. In one embodiment integrated GPS/IMU 202 is a CNS 5000 from KVH Industries, Inc. and NovAtel, Inc., and has a 6 axis IMU and a RTK GPS Receiver. Transceiver 204 communicates with Base Station 44.

Figure 5:
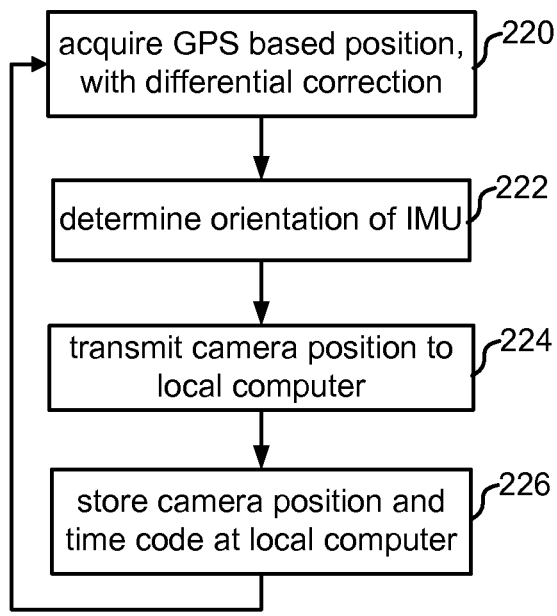
FIG. 5 is a flow chart depicting one embodiment of a process performed by the electronics associated with the movable object.

FIG. 5 is a flow chart describing one embodiment of the automatic operation of GPS/IMU 202 and computer 200. In step 220, the system will acquire a GPS-based location in world space with differential correction, as explained above. In step 222, the system will determine orientation information. The location information and orientation information is provided to computer 200 in step 224. In step 226, computer 200 will add a time code to and store the location and orientation information. The process of FIG. 5 will be repeated automatically and continuously during operation of the system of FIG. 1. Transceiver 204 will perform the process of FIG. 3C.

Figure 6:
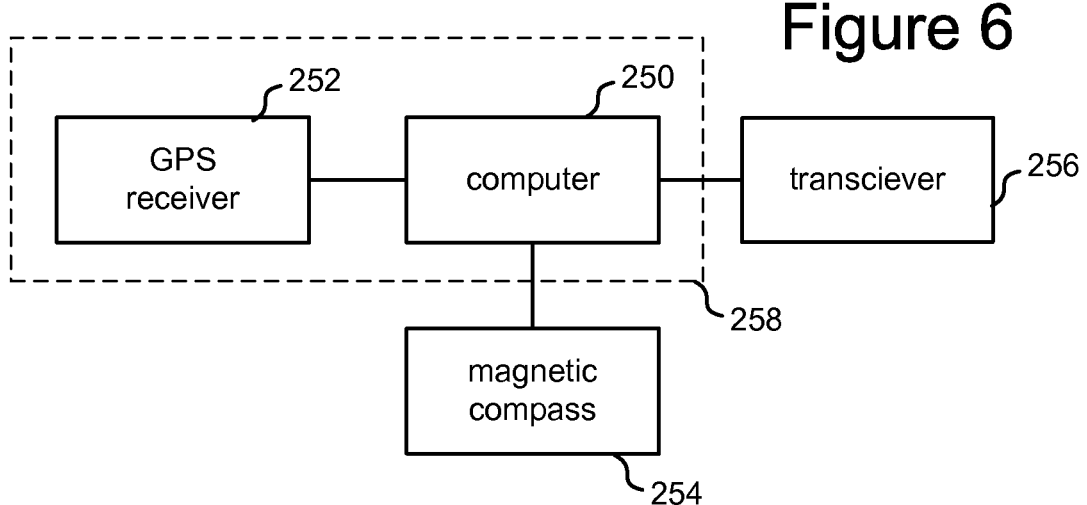
FIG. 6 is a block diagram of one embodiment of the electronics associated with the movable object.

FIG. 6 is a block diagram depicting the components on power boats 14 and 16. FIG. 6 shows computer 250 in communication with GPS Receiver 252, magnetic compass 254 and transceiver 256. Computer 250 and GPS Receiver 252 are in a waterproof case 258. Transceiver 256 communicates with Base Station 44.

Figure 7:
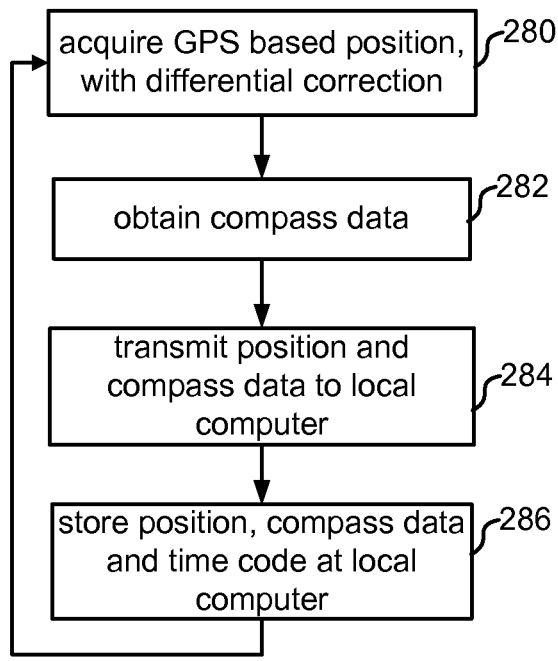
FIG. 7 is a flow chart depicting one embodiment of a process performed by the electronics associated with the movable object.

FIG. 7 is a flow chart describing the automatic operation of the components of FIG. 6. In step 280, GPS-based location in world space, with differential correction, is acquired by GPS Receiver 252. In step 282, magnetic compass 254 acquires a compass heading. In step 284, the compass heading and the GPS derived location are transmitted to computer 250. In step 286, computer 250 will add a time code to and store the location and compass data. The process of FIG. 7 will be repeated automatically and continuously during operation of the system of FIG. 1. Transceiver 256 will perform the automatic process of FIG. 3C.

Figure 8:
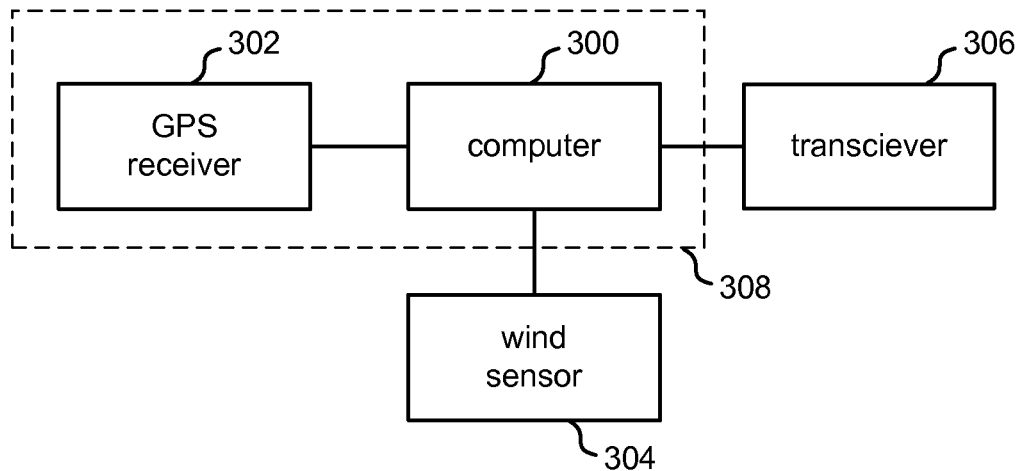
FIG. 8 is a block diagram of one embodiment of the electronics associated with the movable object.

FIG. 8 is a block diagram depicting the components on the buoys (e.g., buoy 10 and buoy 12). FIG. 8 shows computer 300 in communication with GPS Receiver 302, wind sensor 304 and transceiver 306. Computer 300 and GPS Receiver are in a waterproof case. GPS Receiver 302 is a RTK GPS Receiver. Wind sensors 304 includes one or more sensors known in the art that can sense wind speed and wind direction. Transceiver 306 communicates with Base Station 44. Note that any of the sensors described herein can be implemented as one or more sensors.

Figure 9:
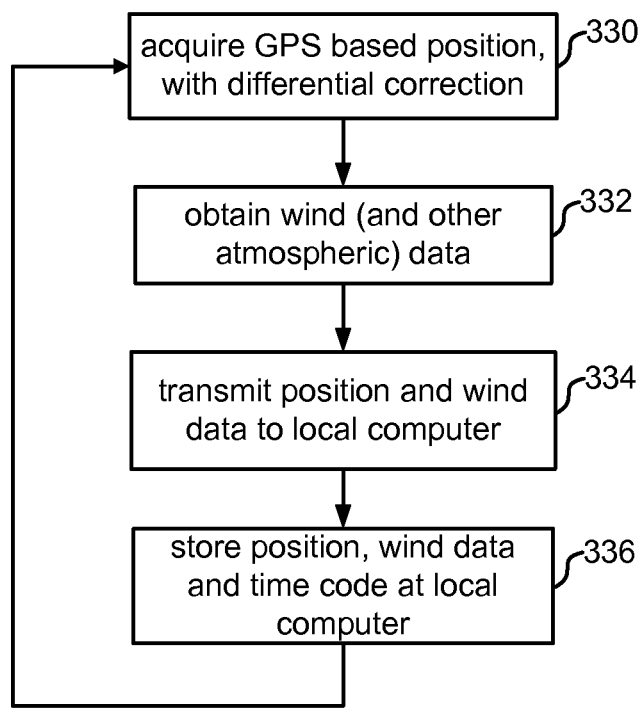
FIG. 9 is a flow chart depicting one embodiment of a process performed by the electronics associated with the movable object.

FIG. 9 is a flow chart describing one embodiment of the automatic process performed by the components of FIG. 8. In step 330, GPS Receiver 302 acquires a GPS-based location in world space, with differential correction as described above. In step 332, wind sensor 304 obtains wind data, including wind speed and wind direction. In other embodiments, other sensors can be used to sense other atmospheric conditions. In step 334, the GPS derived location and wind data is provided to computer 300. In step 336, computer 300 will add a time code to and store the GPS derived location and wind data. The process of FIG. 9 will be repeated automatically and continuously during operation of the system of FIG. 1. Transceiver 306 will perform the process of FIG. 3C.

Figure 10:
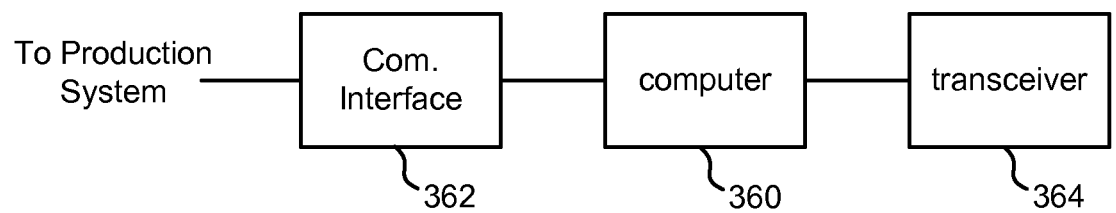
FIG. 10 is a block diagram of one embodiment of a Base Station.

FIG. 10 is a block diagram depicting the components of Base Station 44. FIG. 10 shows computer 360 in communication with communication interface 362 and transceiver 364. Communication interface 362 (e.g., Ethernet card, modem, router, wireless access point, etc.) provides for communication to Production System 40. Transceiver 364 wirelessly communicates with the transceivers 108, 204, 256 and 306. Computer 360 (as well as computers 100, 200, 250 and 300) can be any suitable computer known in the art. In one embodiment, the computers are ruggedized.

Figure 11:
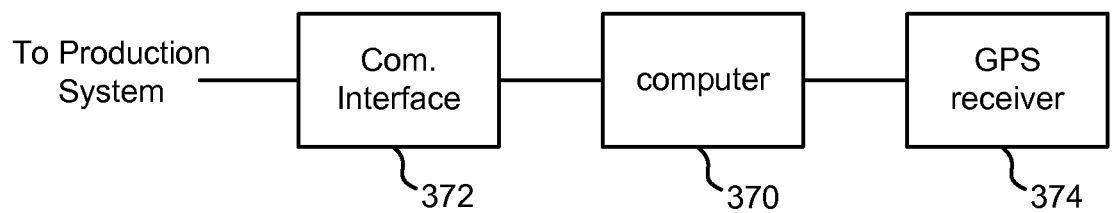
FIG. 11 is a block diagram of one embodiment of a Reference Station.

FIG. 11 is a block diagram depicting one embodiment of the components of Reference Station 46. FIG. 11 shows computer 370 in communication with communication interface 372 and GPS Receiver 374. In one embodiment, communication interface 372 (e.g., Ethernet card, modem, router, wireless access point, etc.) provides for communication to Production System 40 and/or communication interface 362 of Base Station 44. GPS Receiver 374 receives signals from GPS satellites and determines its location in world space. Because Reference Station 46 is accurately surveyed, computer 370 (or GPS Receiver 374) can calculate differential GPS error correction information for the other GPS Receivers of the system.

Figure 12:
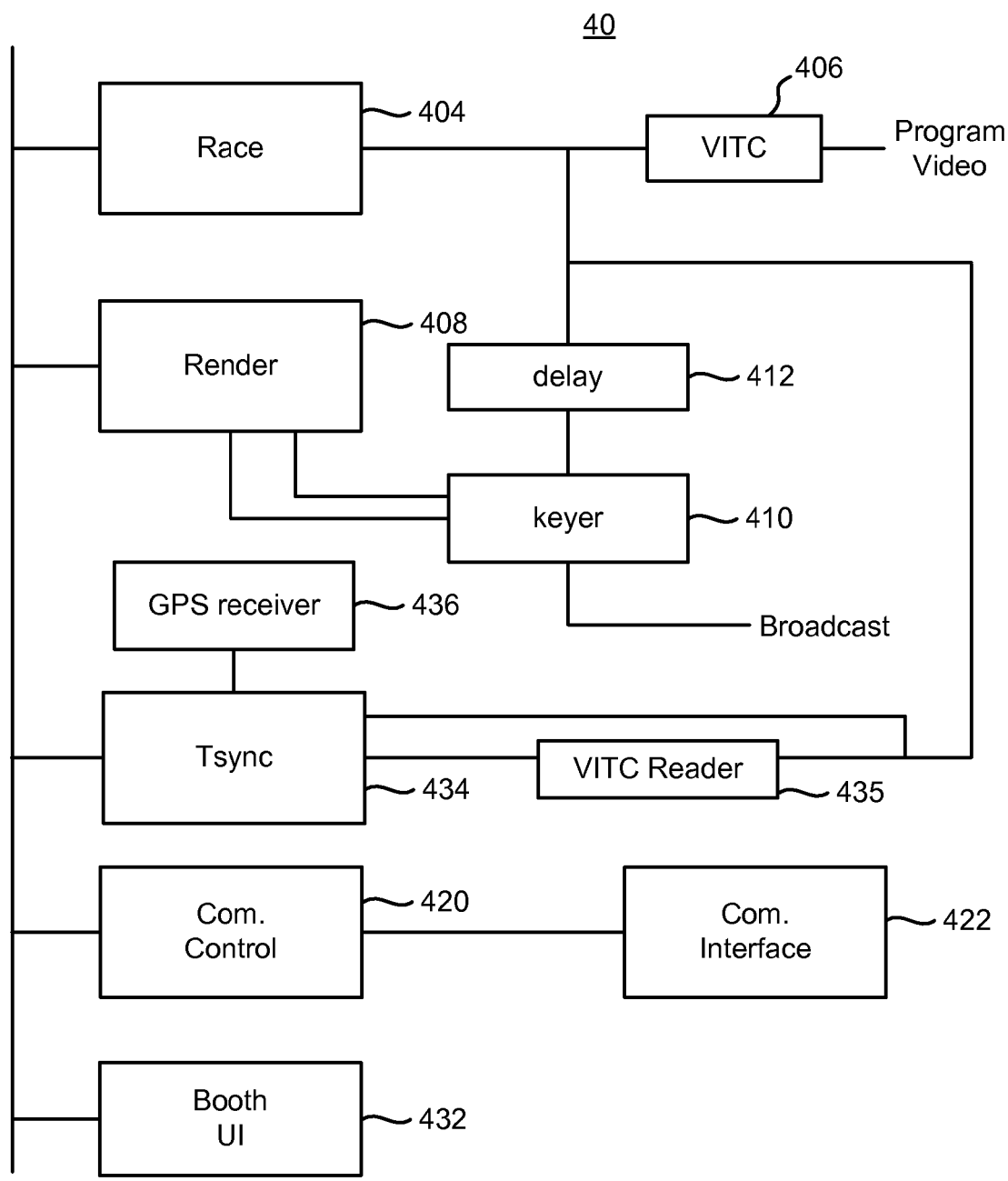
FIG. 12 is a block diagram of one embodiment of a production center.

FIG. 12 is a block diagram of production center 40. In one embodiment, production center 40 includes Race computer 404, Render computer 408, Tsync computer 434, Communication Control computer 420 and Booth User Interface (UI) computer 432 all in communication with each other via a network (e.g., Ethernet).

Communication Control computer 420 is connected to Communication Interface 422 (e.g., network card, modem, router, wireless access point, etc.), which is in communication with Base Station 44 and Reference Station 46. Via Communication Interface 422, Communication Control computer 420 receives the sensor data from camera apparatus 22 mounted to helicopter 20, the sail boats, the power boats, the buoys and other sources of data. Communication Control computer 420 synchronizes and stores the sensor data (locally or with another computer). Communication Control computer 420 also receives differential GPS error correction information from the GPS Reference Station 46 and sends that data to the various GPS Receivers described above.

Vertical Interval Time Code (VITC) inserter 404 receives program video (from helicopter 20 via Video Communication System 42) and adds a time code. Race computer 404 receives the video from VITC inserter 406 and sensor data from Communication Control computer 420. Race computer 404 uses the sensor data described herein to calculate/update metrics and performance data, and determine how/where to create graphics. For example, Race computer 404 may determine where in world coordinates lay lines should be (see discussion bellow) and then transform the world coordinates of the lay lines to positions in a video image. Race computer uses the time code in the video to identify the appropriate sensor data (including camera data, boat position/orientation data and atmospheric data).

Although it is Race computer 404 that determines the graphics to be inserted into the video, it is Render computer 408 that actually draws the graphics to be inserted into the video. Race computer 504 sends to Render computer 408 a description of the graphics to draw. Render computer 408 uses the information from race computer 504 to create an appropriate key and fill signals which are sent to keyer 410. Keyer 410 uses the key signal from render computer 408 to blend the graphics defined by the fill signal with the program video. The program video is provided to keyer 410 from video delay 412, which receives the program video from VITC 406. Video delay 412 is used to delay the video to account for the processing of Race computer 404 and Render computer 408. A video is still considered live if it is delayed a small number of frames (or small amount of time); for example, live video may include video that was delayed a few seconds.

Booth UI computer 532 has a monitor with a mouse (or other pointing device) or touch screen (or other type of user interface) which displays the available graphics that the system can add to the video. An operator can touch the screen to choose a particular graphic. This selection is sent to Communication Control computer 420 and Race computer 404.

Race computer 504 presents feedback to the Booth UI computer 432 which is transformed into a visual representation of confidence-of-measure and availability on a GPS Receiver basis. Race computer 404 smoothes small gaps in data via interpolation. Race computer 404 also stores data for use in replay. Render computer 408 can interpolate the 2D coordinates of the objects in video between frames since (in one embodiment) Race computer 404 only computes positions per frame. In one embodiment, the functions of Race computer 404 and Render computer 408 can be combined into one computer. In other embodiment, other computers or components of FIG. 12 can be combined. For example, some computers can perform the function of keyer 410, delay 412, and/or VITC inserter 406.

Tsync computer 434 is used to synchronize video time to GPS time. Tsync 434 is connected to GPS Receiver 436, VITC reader 435 and VITC inserter 406. VITC reader 435 is also connected to the output VITC inserter 406. FIG. 13 is a flowchart describing the operation of Tsync 534. GPS Receiver 436 outputs the GPS time to Tsync 434 once per second. This message contains time, date and status. The receiver also outputs a 1 Hz pulse. At (within 1 us of) the top of every second, the pulse signals the time. Some milliseconds later, the message is output. Tsync computer 434 receives these events and records the PC system time when the events happen (step 470). Tsync computer 434 has a vertical sync detector installed on one of the ISA slots. This board generates an interrupt signal once at the beginning of every odd field (step 472). When this interrupt occurs, the Tsync computer 534 PC records the PC time. Tsync 434 is also reading VITC data from the VITC reader 435 (step 474). When the last character of a VITC packet is received, the VITC time (video time) is recorded (step 476). Tsync computer 434 interpolates between GPS time values, to determine a GPS time at the start of a frame. This determined GPS time is matched to the VITC value for that frame in step 478. In step 480, a message is sent from Tsync 434 to Communication Control computer 420 indicating a GPS time at the beginning of a frame and the VITC time at the beginning of the same frame. This relationship is used by the system to match GPS data with the appropriate video frame.

FIG. 14 is a flow chart describing one embodiment of a process for enhancing video at Production System 40. In step 500, the system at Production System 40 will receive video from camera apparatus 22 of helicopter 20 (or other video). In step 502, location and orientation data will be received at Production System 40 from camera apparatus 22 of helicopter 20. In step 504, location and orientation data will be received at Production System 40 from the sailboats. In step 506, location orientation data will be received at Production System 40 from the motor boats. In step 508, location and/or atmospheric data is received at Production System 40 from the buoys. In step 510, the system at Production System 40 will calculate or update any metrics or performance data. For example, the system may be keeping track of speed, top speed, average speed, path, etc. In step 512, the system will identify the appropriate camera data (e.g., camera location and orientation) for performing the enhancement (e.g., adding one or more graphics) to the current video. The appropriate camera data can be obtained by matching time codes of the video to be enhanced with the time code for the appropriate sensor data. In step 514, any appropriate metrics or performance data is identified using time codes or other means. In step 516, video is enhanced by editing existing video or creating new video. In step 518, the enhanced video is transmitted or stored. Note that some of the steps of FIG. 13 are performed continuously while others are performed once for every frame or field of video, as appropriate. For example, steps 512-518 would be performed for every frame or field of video that is enhanced. Similarly, steps 500-510 can be performed continuously and/or concurrently. In other embodiments, other sequences can be used.

FIG. 15 is a flow chart describing one embodiment for enhancing video. For example, the process of FIG. 15 is one example implementation of step 516 of FIG. 14. In step 550 of FIG. 15, the system will determine or access one or more locations in world coordinates (e.g., coordinates in world space) of one or more objects. In step 552, the system will determine and/or access the relevant atmospheric data. In step 554, the system will identify and determine locations in world coordinates of graphics to add to the video. That is, based on the locations in world coordinates of one or more moving objects (see step 550) and the atmospheric data (see step 552), the system will create some graphics and relate those graphics to world coordinates. The graphics will include a set of locations that define where the graphics are to be world space. In step 556, the locations in world coordinates are transformed to positions in video coordinates using the camera data (position and orientation of the movable camera attached to the helicopter) discussed above. In step 558, the one or more graphics are drawn for the video using the positions in the video coordinates based on the transformations of step 556.

In step 560, the graphics created in step 558 are added to the video without drawing over (occluding) images of real world objects. Once it is determined where to add a graphic to the video, the system needs to make sure not to draw the graphic over objects that should not have a graphic drawn over them. In one embodiment, the system will blend the graphic using a keyer or similar system. A graphic and video are blended by controlling the relative transparency of corresponding pixels in the graphic and in the video through the use of blending coefficients. One example of a blending coefficient is an alpha signal used in conjunction with a keyer. The value of a blending coefficient for a pixel in the graphic is based on the luminance and chrominance characteristics of that pixel, or a neighborhood of pixels in the video. Inclusions and exclusions can be set up which define which pixels can be drawn over and which pixels cannot be drawn over based on colors or other characteristics. For example, U.S. Pat. No. 6,229,550, incorporated herein by reference in its entirety, provides one example how to blend a graphic using keying based on color.

In another embodiment, geometric keying can be used. In this embodiment, the system will know locations of real word objects based on the GPS information and orientation information. The system will model where those objects are and make sure not to draw over those locations. Either type of keying can be used to make sure that the graphics do not occlude real world objects. Rather, using this type of keying will allow the real world objects to occlude the graphics for more realistic affect.

Step 556 includes transforming locations in world coordinates to positions in the video. The task is to calculate the screen coordinates, $(s_x, s_y)$, given the world coordinates (world space) of a point. In practice, the point in world space might correspond to a physical object like a boat location, or a part of a geometrical concept, like a lay line, but in general can be any arbitrary point. One example method is to break the overall mapping into three separate mappings:

A mapping from three dimensional (3D) points expressed in world coordinates (world space) to 3D points expressed in camera centered coordinates. We denote this mapping as $T_{WTC}$.

A mapping from 3D points expressed in camera centered coordinates, to undistorted two dimensional (2D) screen coordinates (e.g., a position in the video). This mapping models the effects of cameras; i.e. producing 2D images from 3D world scenes. We will denote this mapping as K.

A mapping from undistorted screen coordinates to distorted screen coordinates (e.g., a position in the video). This mapping models various effects that occur in cameras using lenses; i.e. non-pinhole camera effects. We will denote this mapping as f.

When composited together, the three mappings create a mapping from world coordinates into screen coordinates:

$$\begin{pmatrix} X_w \\ Y_w \\ Z_w \end{pmatrix} \xrightarrow{T_{WTC}} \begin{pmatrix} X_c \\ Y_c \\ Z_c \end{pmatrix} \xrightarrow{K} \begin{pmatrix} s_x \\ s_y \end{pmatrix} \xrightarrow{f} \begin{pmatrix} s'_x \\ s'_y \end{pmatrix} \qquad (1)$$

Each of the three mapping noted above will now be described in more detail.

The mapping from 3D world coordinates to 3D camera centered coordinates ($T_{WTC}$) will be implemented using 4×4 homogeneous matrices and 4×1 homogeneous vectors. The simplest way to convert a 3D world point into a 3D homogeneous vector is to add a 1 into the 4th element of the 4×1 homogeneous vector:

$$\underbrace{\begin{pmatrix} X_w \\ Y_w \\ Z_w \end{pmatrix}}_{inhomogenous} \mapsto \underbrace{\begin{pmatrix} X_w \\ Y_w \\ Z_w \\ 1 \end{pmatrix}}_{homogenous} = X_W \qquad (2)$$

The way to convert from a 3D homogeneous vector back to a 3D inhomogeneous vector is to divide the first 3 elements of the homogenous vector by the 4th element. Note that this implies there are infinitely many ways to represent the same inhomogeneous 3D point with a 3D homogeneous vector since multiplication of the homogeneous vector by a constant does not change the inhomogeneous 3D point due to the division required by the conversion. Formally we can write the correspondence between one inhomogeneous vector to infinitely many homogeneous vectors as:

$$\underbrace{\begin{pmatrix} X_w \\ Y_w \\ Z_w \end{pmatrix}}_{inhomogeneous} \mapsto k \underbrace{\begin{pmatrix} X_w \\ Y_w \\ Z_w \\ 1 \end{pmatrix}}_{homogeneous} \quad (3)$$

for any $k \neq 0$.

In general the mapping $T_{WTC}$ can be expressed with a 4×4 matrix:

$$T_{WTC} = \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} \quad (4)$$

which can be expressed using row vectors as:

$$T_{WTC} = \begin{bmatrix} t^{1T} \\ t^{2T} \\ t^{3T} \\ t^{4T} \end{bmatrix} \quad (5)$$

Finally if we use homogeneous vectors for both the world point in world coordinates, $X_w$, and the same point expressed in camera centered coordinates, $X_c$, the mapping between the two is given by matrix multiplication using $T_{WTC}$:

$$X_c = T_{WTC} X_w \quad (6)$$

If we want the actual inhomogeneous coordinates of the point in the camera centered coordinate system we just divide by the 4th element of $X_c$. For example if we want the camera centered x-component of a world point we can write:

$$X_c = \frac{t^{1T} X_w}{t^{4T} X_w} \quad (7)$$

To build the matrix $T_{WTC}$, we start in the world coordinate system (word space)—which is a specific UTM zone—and apply the following transformations:

Translate to the helicopter mounted camera location (from GPS Receiver 104): T ($H_x$, $H_y$, $H_z$)

Account for the helicopter rotation relative to the world coordinate system, based on IMU 106:
 $R_z$ (−$Pan_{Heli}$)
 $R_x$ (−$Tilt_{Heli}$) Heil,
 $R_y$ ($Roll_{Heli}$)

Account for outer axis (outer axis of camera system 102) orientation relative to helicopter frame (adjustments for misalignment of the outer ring relative to the helicopter body):
 $R_z$ (PanAdjust)
 $R_x$ (TiltAdjust)
 $R_y$ (RollAdjust)

Account for outer axis transducer measurement from camera system 102 and offset of zero readings relative to outer axis:
 $R_z$ ($Pan_{Outer}$+PanAdjust2)
 $R_x$ ($Tilt_{Outer}$+TiltAdjust2)

Note that PanAdjust2 and TiltAdjust2 are adjustment values for imperfections in the outer axis orientation. If the output of the sensor should be 0 degrees, these parameters are used to recognize 0 degrees. $Pan_{Outer}$ and $Tilt_{Outer}$ are the sensor (e.g., transducer) readings output from the camera system 102 for the outer axis.

Account for non-linearity of inner axis (of camera system 102) pan and tilt transducer measurements via a look-up table
 $Pan_{Inner\_linearized}$=L ($Pan_{Inner}$)
 $Tilt_{Inner\_linearized}$=L'($Tilt_{Inner}$)

Account for inner axis transducer measurements and offset of zero readings relative to inner ring:
 $R_z$ ($Pan_{Inner\_linearized}$ PanAdjust3)
 $R_x$ ($Tilt_{Inner\_linearized}$+TiltAdjust3)
 $R_y$ ($Roll_{Inner}$+RollAdjust3)

Note that PanAdjust3, TiltAdjust3 and RollAdjust3 are adjustment values for imperfections in the inner axis orientation. If the output, of the sensor should be 0 degrees, these parameters are used to recognize 0 degrees. $Pan_{Inner}$, $Tilt_{Inner}$ and $Roll_{Inner}$ are the sensor (e.g., transducer) readings output from the camera system 102 for the inner axis.

Finally, convert to standard coordinate convention for camera centered coordinate systems with x-axis pointing to the right of the image, y-axis pointing up in the image, and z-axis pointing behind the camera $$R_x\left(\frac{\pi}{2}\right)$$

Thus the final rigid-body transform, $T_{WTC}$ which converts points expressed in world coordinates to points expressed in the camera centered coordinate system and suitable for multiplication by a projection transform is given by:

$$T_{WTC} = \quad (8)$$

$$R_x\left(\frac{\pi}{2}\right) R_y(Roll_{Inner} + RollAdjust3) \cdot R_x(Tilt_{Inner\_linearized} + TiltAdjust3) \cdot$$

$$R_z(Pan_{Inner\_linearized} + PanAdjust3) \cdot R_x(Tilt_{Outer} + TiltAdjust2)$$

$$R_z(Pan_{Outer} + PanAdjust2) \cdot R_y(RollAdjust)$$

$$R_x(TiltAdjust) R_z(PanAdjust) \cdot R_y(Roll_{Heli})$$

$$R_x(-Tilt_{Heli}) R_z(-Pan_{Heli}) T(H_x, H_y, H_z)$$

The form of the three rotation matrices: $R_x$, $R_y$, $R_z$ suitable for use with 4×1 homogeneous vectors are given below. Here the rotation angle specifies the rotation between the two coordinate systems basis vectors.

$$R_x(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (9)$$

$$R_y(\alpha) = \begin{bmatrix} \cos\alpha & 0 & -\sin\alpha & 0 \\ 0 & 1 & 0 & 0 \\ \sin\alpha & 0 & \cos\alpha & 0 \\ 0 & 0 & 0 & 1 \end{bmatrix} \quad (10)$$

-continued $$R_z(\alpha) = \begin{bmatrix} \cos\alpha & \sin\alpha & 0 & 0 \\ -\sin\alpha & \cos\alpha & 0 & 0 \\ 0 & 0 & 1 & 0 \\ 0 & 0 & 0 & 1 \end{bmatrix} \quad (11)$$

The matrix representation of the translation transform that operates on 4×1 homogeneous vectors is given by:

$$T(d_x, d_y, d_z) = \begin{bmatrix} 1 & 0 & 0 & d_x \\ 0 & 1 & 0 & d_y \\ 0 & 0 & 1 & d_z \\ 0 & 0 & 0 & 1 \end{bmatrix} \quad (12)$$

The mapping of camera centered coordinates to undistorted screen coordinates (K) can also be expressed as a 4×4 matrix which operates on homogenous vectors in the camera centered coordinate system. In this form the mapping from homogeneous camera centered points, $X_c$, to homogeneous screen points, $S_u$, is expressed:

$$S_u = KX_c \quad (13)$$

$$w \begin{pmatrix} s_x \\ s_y \\ s_z \\ 1 \end{pmatrix} = KX_c \quad (14)$$

To get the actual undistorted screen coordinates from the 4×1 homogenous screen vector we divide the first three elements of $S_u$ by the 4th element.

Note further that we can express the mapping from homogeneous world points to homogeneous undistorted screen points via matrix multiplication.

$$S_u = KT_{WTC}X_w \quad (15)$$
$$= PX_w$$

where, $$P = KT_{WTC}$$

One embodiment uses a pinhole camera model for the projection transform K. If it is chosen to orient the camera centered coordinate system so that the x-axis is parallel to the $s_x$ screen coordinate axis, and the camera y-axis is parallel to the $s_y$ screen coordinate axis—which itself goes from the bottom of an image to the top of an image—then K can be expressed as:

$$K = \begin{bmatrix} -\dfrac{f'}{par} & 0 & u_o & 0 \\ 0 & -f' & v_o & 0 \\ 0 & 0 & A & B \\ 0 & 0 & 1 & 0 \end{bmatrix} \quad (16)$$

where, $$f' = \frac{N_y/2}{\tan(\varphi/2)}$$

$N_y$=number of pixels in vertical screen direction.

φ=vertical field of view par=pixel aspect ratio $u_o, v_o$=optical center

A,B=Clipping plane parameters. (17)

The clipping plane parameters, A, B, do not affect the projected screen location, $s_x$, $s_y$, of a 3D point. They are used for the details of rendering graphics and are typically set ahead of time. The number of vertical pixels, $N_y$, and the pixel aspect ratio par are predetermined by video format used by the camera. The optical center, ($u_o$, $v_o$) is determined as part of a calibration process. The remaining parameter, the vertical field of view φp, is the parameter that varies dynamically.

The screen width, height and pixel aspect ratio are known constants for a particular video format: for example $N_x$=1920, $N_y$=1080 and par=1 for 1080i. The values of $u_o$, $v_o$ are determined as part of a calibration process. That leaves only the field of view, φ, which needs to be specified before K is known.

The field of view is determined on a frame by frame basis using the following steps:
  use the measured value of the 2× Extender to determine the 2× Extender state;
  use the 2× Extender state to select a field of view mapping curve;
  Use the measured value of field of view, or equivalently zoom, and the particular field of view mapping curve determined by the 2× Extender state to compute a value for the nominal field of view;
  use the known 2× Extender state, and the computed value of the nominal field of view in combination with the measured focus value, to compute a focus expansion factor; and
  compute the actual field of view by multiplying the nominal field of view by the focus expansion factor.

One field of view mapping curve is required per possible 2× Extender state. The field of view mapping curves are determined ahead of time and are part of a calibration process.

One mapping between measured zoom, focus and 2× Extender and the focus expansion factor is required per possible 2× Extender state. The focus expansion factor mappings are determined ahead of time and are part of a calibration process.

The mapping (f) between undistorted screen coordinates to distorted screen coordinates (pixels) is not (in one embodiment) represented as a matrix. In one example, the model used accounts for radial distortion. The steps to compute the distorted screen coordinates from undistorted screen coordinates are:
  start with the inhomogenous screen pixels $s_u=(s_x,s_y)^T$
  compute the undistorted radial distance vector from a center of distortion, $s_o$ $\delta r=s_u-s_o$.
  compute a scale factor $\alpha=1+k_1\|\delta r\|+k_2\|\delta r\|^2$
  compute the inhomogeneous screen pixel vector $s_d=\alpha\delta r+s_o$ Some embodiments will also normalize the data.

The two constants $k_1$, $k_2$ are termed the distortion coefficients of the radial distortion model. An offline calibration process is used to measure the distortion coefficients, $k_1$, $k_2$, for a particular type of lens at various 2× Extender states and zoom levels. Then at run time the measured values of zoom and 2× Extender are used to determine the values of $k_1$ and $k_2$ to use in the distortion process. If the calibration process is not possible to complete, the default values of $k_1=k_2=0$ are used and correspond to a camera with no distortion. In this case the distorted screen coordinates are the same as the undistorted screen coordinates.

The above discussion provides one set of examples for tracking objects and enhancing video from a mobile camera based on that tracking. The technology for accommodating mobile cameras can also be used in conjunction with other systems for tracking and enhancing video, such as the systems described in U.S. Pat. No. 5,912,700; U.S. Pat. No. 5,862,517; U.S. Pat. No. 5,917,553; U.S. Pat. No. 6,744,403; and U.S. Pat. No. 6,657,584. All five of these listed patents are incorporated herein by reference in their entirety.

Figure 16:
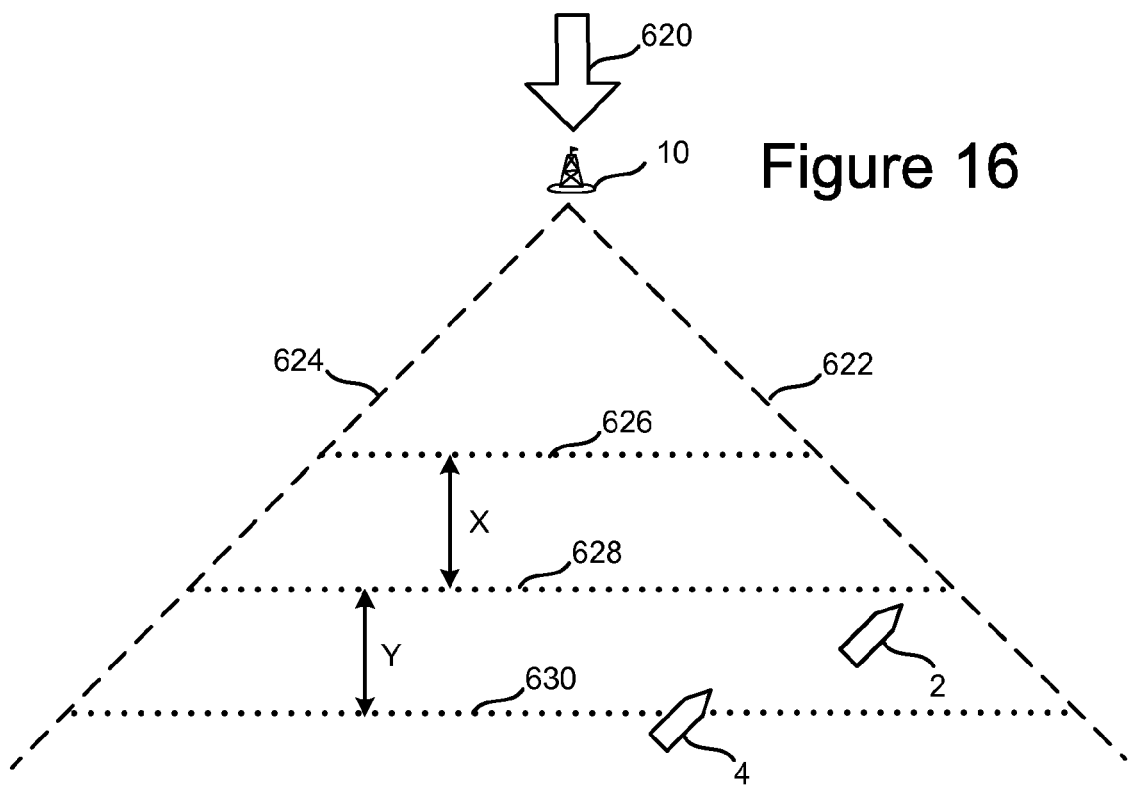
FIG. 16 depicts an example of enhanced video.

FIG. 16 depicts an example of a video image that has been enhanced according to the processes described above. As can be seen, the video includes images of sailboat 2, sailboat 4 and buoy 10. Using the processes described above, the system determines the wind direction and depicts the wind direction using arrow 620. Based on wind speed, wind direction, the location of the buoy 10 in world coordinates and characteristics of the boats, the system determines lay lines 622 and 624 as well as isochrons 626, 628 and 630.

A lay line is a line made up of all points a boat can sail to a mark (e.g., the buoy 10) without having to tack, for a given wind speed and wind direction. If the wind speed or wind direction change, the lay lines will also change. For a given wind speed and direction, there are two lay lines (e.g., lay line 622 and lay line 624). Optionally, a boat will sail parallel to one of the lay lines until it reaches the other lay line, at which point the boat will tack and follow the lay line to the mark.

Isochrons (also called ladder lines) are perpendicular to the mark. Every boat on an isochron is the same amount of time and distance away from the mark, regardless of how close in distance boats are to the mark or the lay lines. Typically, isochrons are drawn to indicate distance between isochrons or time between isochrons.

Figure 17:
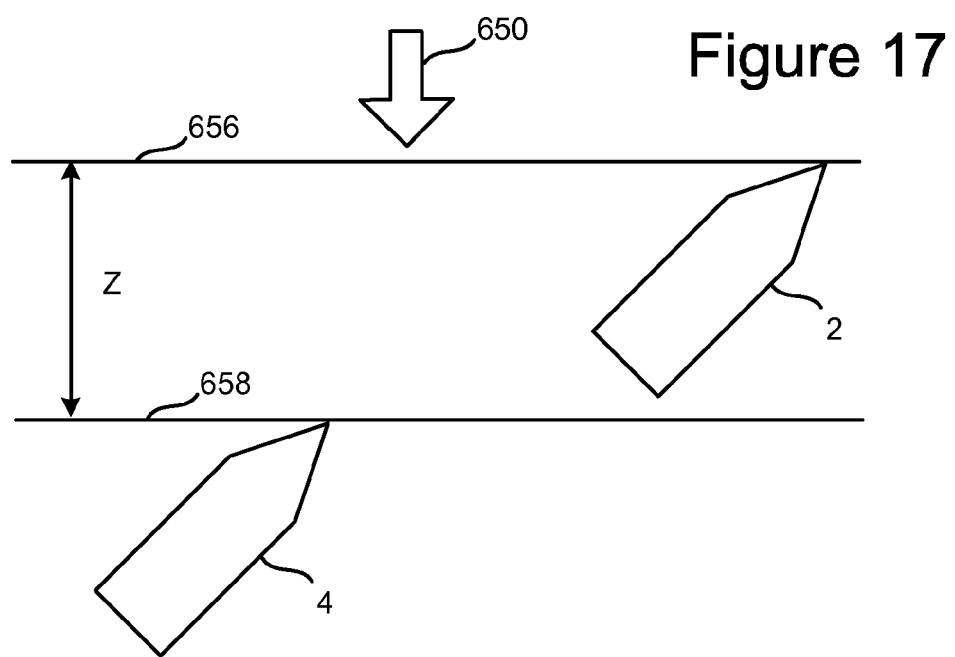
FIG. 17 depicts an example of enhanced video.

In one embodiment, isochrons 626, 628 and 630 are drawn up at predetermined fixed intervals from each other (e.g., interval x and interval y). It is also possible to create custom isochrons at the bow of each boat. For example, FIG. 17 provides another example of an enhanced video image which includes wind arrow 650 indicating the direction of the wind and custom isochrons 656 and 658. Custom isochron 656 is drawn at the bow of boat 2. Custom isochron 658 is drawn at the bow of boat 4. Once the isochrons are drawn for each of the bows of the boats, the system can display the distance between the two isochrons (z) to indicate how far boat 2 is ahead of boat 4. The value of Z can be expressed in terms of distance or time. In one embodiment, custom isochrons that allow the viewer to see the distance between two boats are referred to as advantage lines.

If the viewer were looking at video that shows the boats in the orientation of FIG. 16, it may not be clear to the viewer that boat 2 is ahead of boat 4, but once the viewer sees FIG. 16 it is clear that boat 2 is ahead of boat 4 by a distance of Z (or a time of Z). The graphics added to FIG. 16 also help the user visualize how the boats have to sail. Note that boat 4 occludes isochron 630. Thus, it appears that isochron 630 is drawn below boat 4 or that boat 4 is blocking a view of isochron 630 (in accord with step 560 "add graphics to video without drawing over objects").

Figure 18:
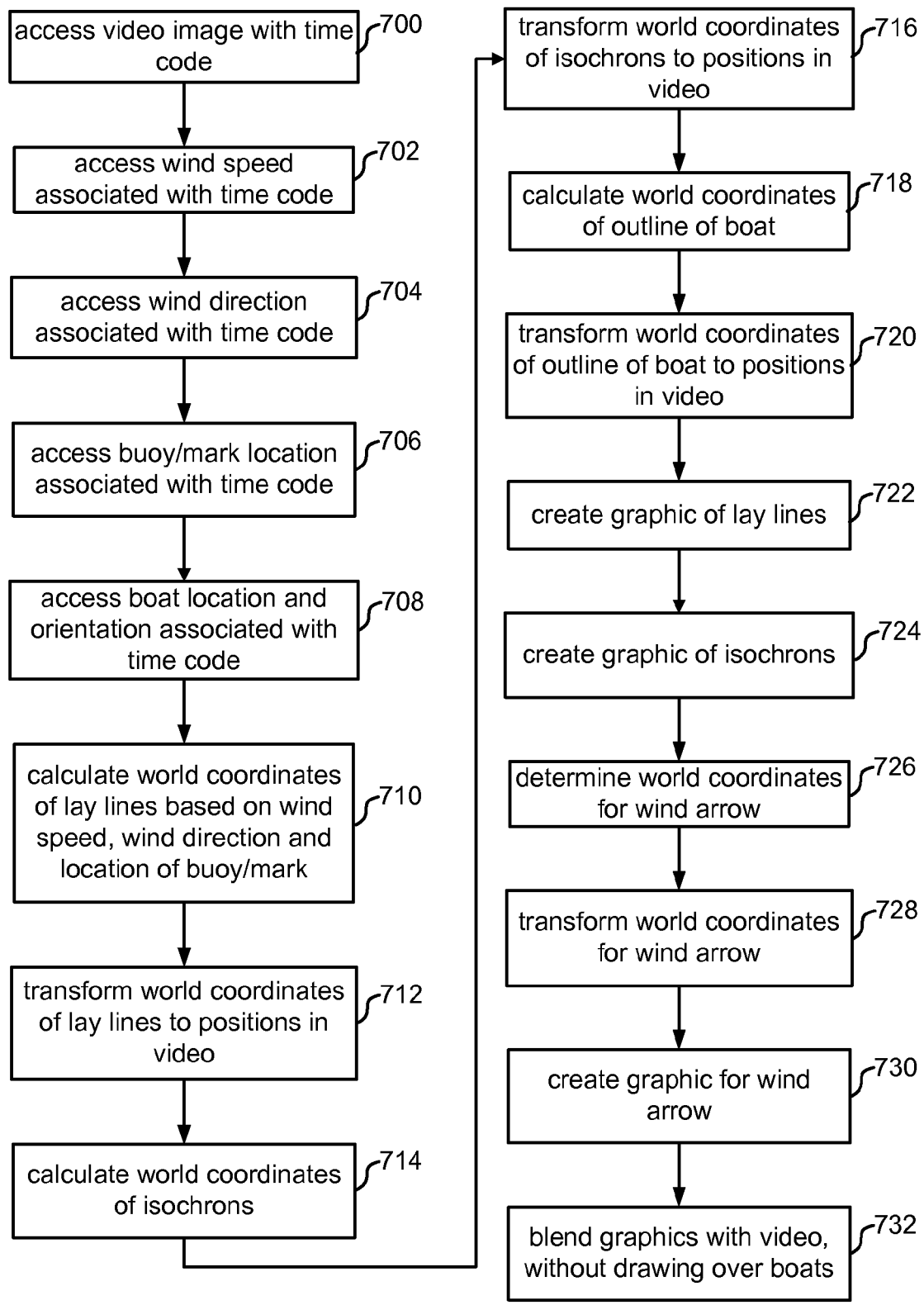
FIG. 18 is a flow chart depicting one embodiment of a process for enhancing video.

FIG. 18 is a flow chart describing one embodiment for enhancing video (e.g., performing step 516 at FIG. 14) in order to add the graphics depicted in FIG. 16. In other words, the process of FIG. 18 is the one example implementation of the process of FIG. 15. In step 700 of FIG. 18, the system will access a video image with a time code. This is the video image (e.g., frame or field) that will be enhanced. In step 702, the system will access the wind speed associated with that time code. In step 704, the system will access wind direction associated with that time code. In step 706, the system will access the buoy location associated with the time code. In step 710, the system will calculate, in world coordinates, the lay lines based on wind speed, wind direction and the location of the buoy. In one embodiment, the world coordinates are three-dimensional coordinates. In step 712, the system will transform the three-dimensional world coordinates of the lay lines (e.g., the end points of the lay lines and in some cases some of the midpoints) to two-dimensional positions in the video. In step 714, the system will calculate world coordinates for the locations of the isochrons. In step 716, the system will transform the world coordinates of the isochrons to positions in the video. In step 718, the system will calculate the world coordinates of the outline of the sail boats. In step 720, the system will transform the world coordinates of the outlines of the sailboats to positions in the video. In step 722, a graphic of the lay lines will be created based on the transformed positions from step 710. In step 724, a graphic for the isochrons will be created based on the transformed positions from step 716. In step 726, the system will determine the world coordinates for the wind arrow. In one embodiment, the wind arrow is placed pointing at the buoy, therefore the world coordinates of the arrow are based on the world coordinates of the buoy 10. In step 728, the world coordinates of the wind arrow are transformed to two-dimensional positions in the video. In step 730, the graphic for the wind arrow is created based on the transformed position from step 728. In step 732, the graphics for the wind arrow, lay lines and isochron are added to the video without drawing over any of the boats, as discussed above. Note that the sequence of FIG. 18 can be changed from that described above. Additionally, the graphics can be created concurrently, or in different orders. Note that the transformation of world coordinates to screen coordinates during the process of FIG. 18 are performed as discussed above.

Figure 19:
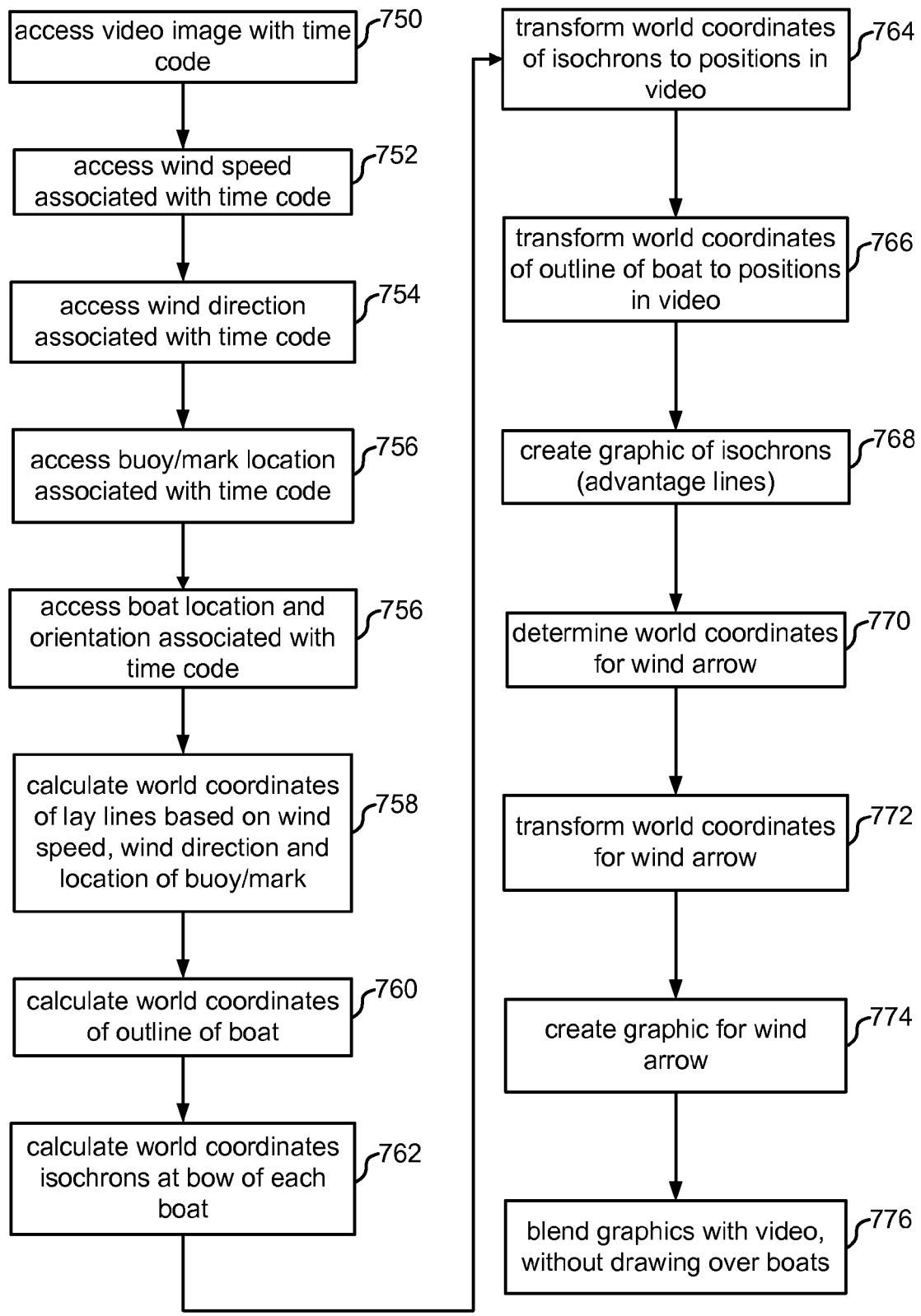
FIG. 19 is a flow chart depicting one embodiment of a process for enhancing video.

FIG. 19 is a flow chart describing one embodiment of the process for enhancing video (implementing step 516 of FIG. 14) to add the graphics depicted in FIG. 17. In other words, the process of FIG. 19 is another embodiment of implementing the process of FIG. 15. In step 750 of FIG. 19, the system will access a video image with a time code. This is the video image (e.g., frame or field) that will be enhanced. In step 752, the system will access wind speed associated with that time code. In step 754, the system will access wind direction associated with that time code. In step 756, the system will access the buoy location associated with that time code. In step 756, the system will access the boat location and orientation associated with that time code. In step 758, the system will calculate world coordinates of the lay lines based on the wind speed, wind direction and location of the buoy. In step 760, the system will determine the world coordinates of the outline of the boat based on the location and orientation of the boat. In step 762, the system will calculate the world coordinates of the isochrons at the bow of each boat. These are the custom isochrons depicted in FIG. 17. The system will know where the bow of the boat is based on step 760. At step 764, the system will transform the world coordinates of the custom isochrons from step 762 to positions in the video using the math discussed above. In step 766, the system will transform the world coordinates of the outline of the boat to positions in the video. In step 768, one or more graphics will be created of the custom isochrons from step 762 (also called advantage lines). In step 770, the system will determine the world coordinates for the wind arrow based on the location of the buoy 10. In step 772, the system will transform the world coordinates for the arrow to a position in the video. In step 774, a graphic of the wind arrow will be created based on the transformed position from step 772. In step 776, the system will blend the graphics with the video. That is, the graphic of the wind arrow and the graphics of the custom isochrons (e.g., isochrons 656 and 658) will be blended with the video image from step 750 such that none of the graphics drawn (isochrons or wind arrow) will be drawn over a boat. The graphics can be created concurrently, or in different orders. Note that the transformation of world coordinates to screen coordinates during the process of FIG. 19 are performed as discussed above.

Figure 20:
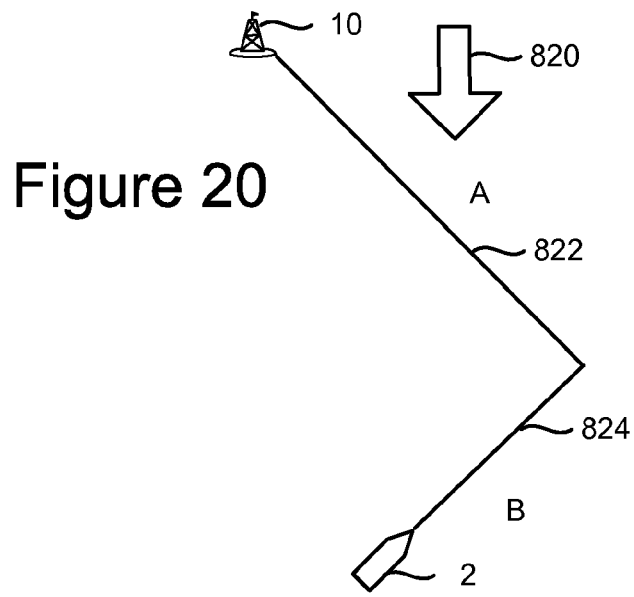
FIG. 20 depicts an example of enhanced video.

FIG. 20 depicts another example of video image enhanced according to the technology described herein. In FIG. 20, boat 2 and buoy 10 are depicted. Additionally, the video image has been enhanced to add wind arrow 820, line segment 822 and line segment 824. Line segments 822 and 824 indicate the distance of the boat from the buoy (mark) 10. The length of line segments 822 and 824 are also depicted as A and B, respectively (which can be in distance or time). This allows a viewer of the sailboat race to see how far a boat is from the mark, which is generally very difficult to do when watching a race. Note that line segments 822 and 824 are drawn so that they do not occlude boat 2 or buoy 10.

Figure 21:
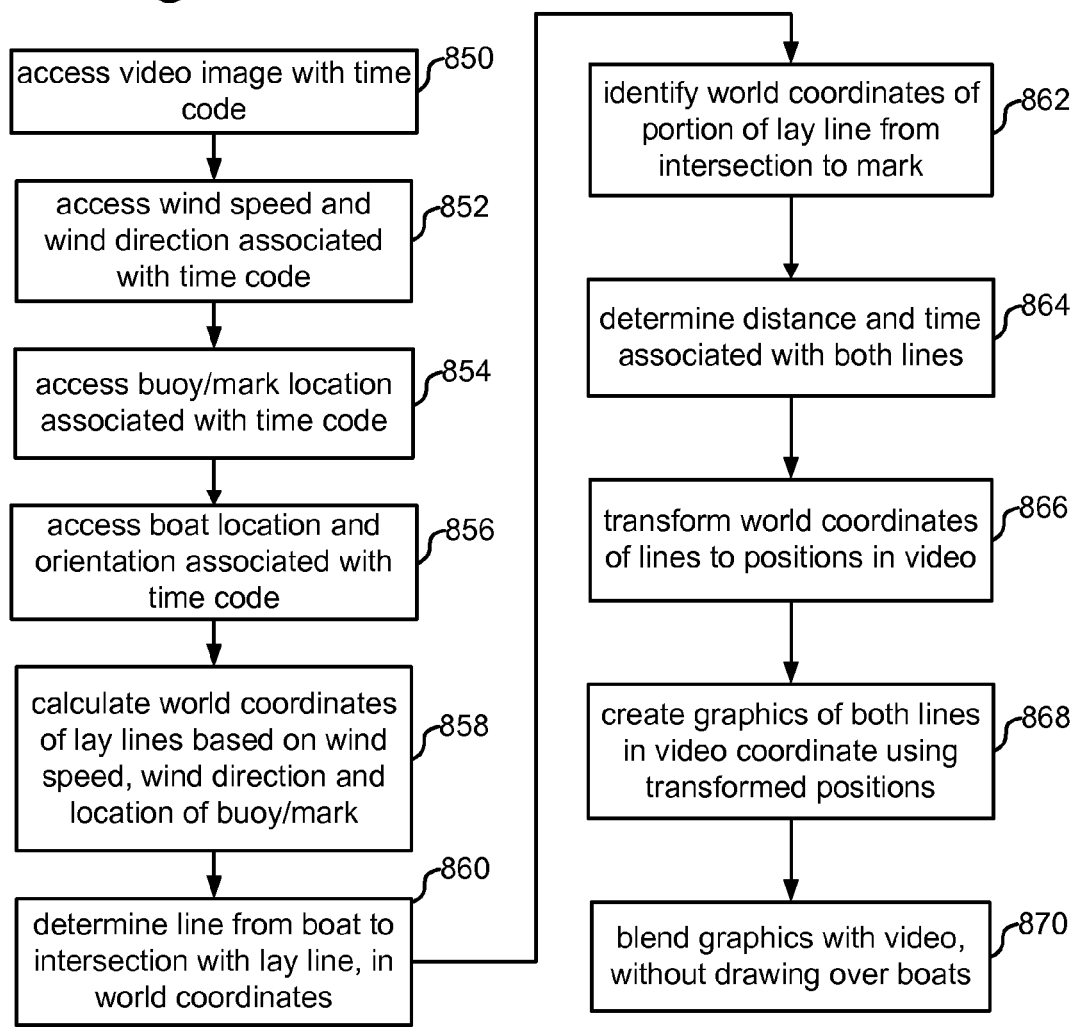
FIG. 21 is a flow chart depicting one embodiment of a process for enhancing video.

FIG. 21 is a flow chart describing one embodiment of a process for enhancing video (step 516 of FIG. 14). The process of FIG. 21 is one example implementation of the flow chart of FIG. 15. In step 850 of FIG. 21, the system will access video image with a time code. This is the video image (e.g., frame or field) that will be enhanced. In step 852, the system will access wind speed and wind direction data associated with the time code. In step 854, the system will access the buoy location association with the time code. In step 856, the system will access the boat location associated with the time code. In step 858, the system will calculate the world coordinates of the lay lines based on the wind speed, wind direction and location of the buoy. In step 860, the system will determine a line from the boat of interest (e.g., boat 2) through an intersection with the lay line, in world coordinates. For example, step 860 includes calculating line 824 of FIG. 20. In step 862, the system will identify the world coordinates of the portion of the lay line from the intersection to the mark. For example, step 862 includes determining the world coordinates of line segment 822. In step 864, distance and time associated with both line segments are determined. In step 866, the system will transform the world coordinates of both line segments to positions in the video. In step 868, a graphic is created for both line segments using the transformed positions. In step 877, the graphics of both lines can be added to the video without drawing over the boats. Note that the wind arrow can be added to the video in the same manner as described above. The graphics can be created concurrently, or in different orders. Note that the transformation of world coordinates to screen coordinates during the process of FIG. 21 are performed as discussed above.

Although the above examples are given with respect to sailing, the technology can be used with other events, too. For example, the same technology can be used with automobile racing. In one example, a GPA tracking system for automobile racing is disclosed in U.S. Pat. No. 6,744,403 (the '403 patent). The technology described above can be added to the system of the '403 patent to enhance the GPA tracking system for enhancing video. The technology described above can also be used with respect to foot racing, soccer, tracking automobiles for a fleet (or other purpose), military applications, tracking hikers, tracking people at cultural events (e.g., concerts, festivals such a Burning Man, carnivals, etc.). The technology is not intended to be restricted to sailing.

One embodiment includes automatically sensing a location of a movable camera that can change locations, receiving position data from a sensor for an object, converting a location in world space to a position in a video image of the camera based on the sensed location of the camera (the location in world space is based on the sensed location of the camera), and enhancing the video image based on the position.

In some embodiment, the sensing the location of the camera includes sensing the location of the camera while the camera is changing location and/or while the camera is unrestrained in a local space.

Some embodiments further include determining an orientation of the camera, with the location in world space being converted to the position in the video image of the camera based on the sensed location of the camera and the determined orientation of the camera.

One embodiment includes a first set of one or more sensors that sense location information for a movable camera that can change locations, a second set of one or more sensors that sense position information for one or more objects, and one or more processors in communication with the first set of one or more sensors and the second set of one or more sensors. The one or more processors obtain a location in world space (e.g., world coordinates) based on the position information from the second set of one or more sensors. The one or more processors convert the location in world space to a position in a video image of the camera based on the sensed location of the camera and enhance the video image based on the position in the video image.

One embodiment includes a first set of one or more sensors that sense location information for a movable camera that is unrestrained in a local space, a second set of one or more sensors that sense orientation information for the camera with the first set of sensors and the second set of sensors being co-located with the camera on an aircraft, a third set of one or more sensors that concurrently sense location information for multiple moving objects, one or more communication stations, and one or more processors in communication with the one or more communication stations. The one or more communication stations are also in communication with the first set of one or more sensors, the second set of one or more sensors and the third set of one or more sensors. The one or more processors receive video from the camera. The one or more processors convert locations of the moving objects into positions in a video image from the camera based on the location information for the camera and the orientation information for the camera. The one or more processors create one or more graphics based on the positions in the video image and add the one or more graphics to the video image.

Note that the flow charts depicted in the drawings shows steps in a sequential manner. However, it is not always required that the steps be performed in the same order as in the flow charts. Furthermore, many of the steps can also be performed concurrently.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for enhancing video, comprising:
    automatically sensing a location and orientation within a three-dimensional world space of a movable camera that can change locations, the camera generating camera-taken video including video imagery of an object visible in the camera-taken video and disposed within the world space;

receiving position data from a sensor indicative of a position within the world space of the visible object;

identifying one or more locations within the world space as being respectively related with at least one virtual graphic;

transforming one or more of the identified locations within the world space to a corresponding plurality of positions in a video coordinate system of a video image that includes at least part of imagery from the camera-taken video; and producing an enhanced video image including the at least one virtual graphic disposed at one or more of the corresponding plural positions defined by said transforming and including said at least part of the imagery from the camera-taken video.

2. The method of claim 1, wherein:

the sensing of the location and orientation of the camera within the three-dimensional world space includes sensing the location and orientation of the camera in real time while the camera is changing location relative to a moving platform to which the camera is movably mounted.

3. The method of claim 1, wherein:

the location of the camera is sensed while the camera is unrestrained in a local space.

4. The method of claim 1, further comprising:

receiving orientation information for the object, wherein the producing of the enhanced video image is partially based on the orientation information and the position data for the object, and wherein the position data and the orientation information for the object are measured and received in real time while the object is moving.

5. The method of claim 4 wherein:

the position data identifies the location in the world space;

the camera is sensing video of an event that is depicted in the video image;

the video image depicts the object;

the producing of the enhanced video image is performed during the event; and the producing of the enhanced video image enhancing includes adding a graphic to the video image such that object occludes the graphic in the video image.

6. The method of claim 1, further comprising:

sensing an atmospheric condition using a sensor, wherein the producing of the enhanced video image includes creating a graphic based on the sensed atmospheric condition and adding the graphic to the video image.

7. The method of claim 1, wherein:

the camera is sensing video of an event; and the producing of the enhanced video image is performed during the event.

8. The method of claim 1 wherein:

the producing of the enhanced video image is performed in real time.

9. The method of claim 1 wherein the sensing of the location of the camera comprises:

determining a location of a sensor; and using the location of the sensor to determine a location of a camera base, the determined orientation of the camera is in relation to the camera base.

10. The method of claim 1 wherein the sensing of the location of the camera comprises:

determining a location of a sensor;

using the location of the sensor to determine a location of an inertial measurement system, the inertial measurement system is used to determine the orientation of the camera; and using the location of the inertial measurement system to determine a location of a camera base, the determined orientation of the camera is in relation to the camera base.

11. The method of claim 1, further comprising:

automatically sensing wind direction and wind speed;

automatically sensing a location of a mark;

automatically identifying one or more locations within the world space for lay lines based on the sensed wind direction and wind speed; and automatically determining isochrons for the lay lines;

wherein the transforming of the one or more of the identified locations within the world space includes converting a set of locations representing the lay lines and isochrons to a set of positions in the video image based on the sensed position and determined orientation of the camera; and wherein the producing of the enhanced video image includes automatically creating graphics of the lay lines and isochrons based on the set of positions and adding the graphics of the lay lines and isochrons to the video image.

12. The method of claim 11, further comprising:

automatically determining location of two more moving boats, the enhancing comprises adding the graphics of the lay lines and isochrons to the video image without occluding images of the boats.

13. The method of claim 1, further comprising:

automatically determining locations of two or more moving boats;

automatically sensing wind direction and wind speed;

automatically sensing a location of a mark;

automatically determining lay lines based on sensed wind direction and wind speed; and automatically determining advantage lines based on the lay lines and the locations of the two or more moving boats;

wherein the transforming of the one or more of the identified locations within the world space includes converting a set of locations representing the advantage lines to a set of positions in the video image based on the sensed position and sensed orientation of the camera;

wherein the producing of the enhanced video image includes automatically creating graphics of the advantage lines based on the set of positions and adding the graphics of the advantage lines to the video image.

14. The method of claim 1, further comprising:

automatically determining locations of one or more moving boats;

automatically sensing wind direction and wind speed;

automatically sensing a location of a mark; and automatically determining lay lines based on sensed wind direction and wind speed;

wherein the transforming of the one or more of the identified locations within the world space includes converting at least a particular location representing a particular lay line to a particular position in the video image based on the sensed position and determined orientation of the camera;

wherein the producing of the enhanced video image includes automatically creating a graphic of the particular lay line and adding the graphic of the particular lay line to the video image based on the particular position.

15. An apparatus for enhancing video, comprising:
a first set of one or more sensors configured to sense location within a three-dimensional (3D) world space and to provide corresponding 3D location information for a movable camera that can change locations;
a second set of one or more sensors configured to sense position within the 3D world space and to provide corresponding 3D position information for one or more movable objects; and
one or more processors in communication with the first set of one or more sensors and the second set of one or more sensors, the one or more processors being configured to obtain a location in the 3D world space based on the position information from the second set of one or more sensors, the one or more processors being configured to convert the obtained location in the 3D world space to a corresponding position in a video image that includes video imagery obtained from the camera based on the sensed location of the camera and being configured to enhance the video image based on the position in the video image;
wherein the enhancing of the video image includes:
identifying one or more locations within the 3D world space as being respectively related with at least one virtual graphic;
transforming one or more of the identified locations within the 3D world space to a corresponding plurality of positions in a video coordinate system of the video image.

16. The apparatus of claim 15, wherein:
the one or more processors obtain the location in world space based on GPS data that identifies the location in world space.

17. The apparatus of claim 15, wherein:
the one or more processors obtain the location in world space by using GPS data that identifies a location that has a functional relationship with the location in world space.

18. The method of claim 15, further comprising:
a third set of one or more sensors that sense orientation information for the object, the one or more processors enhance the video image based on the orientation information, the position information and the orientation information are measured in real time while the object is moving.

19. The apparatus of claim 18, wherein:
the position information identifies the location in world space;
the video image depicts the object;
the one or more processors enhance the video image during the event; and
the one or more processors enhance the video image by adding a graphic to the video image such that object occludes the graphic in the video image.

20. The apparatus of claim 19, further comprising:
a fourth set of one or more sensors that sense an atmospheric condition, the one or more processors enhance the video image by creating a graphical image based on the sensed atmospheric condition and adding the graphical image to the video image.

21. The apparatus of claim 15, wherein:
the camera is sensing video of an event; and
the one or more processors enhance the video image during the event.

22. The apparatus of claim 15, wherein:
the one or more processors enhance the video image in real time.

23. The apparatus of claim 15, further comprising:
a set of one or more orientation sensors configured to provide information indicating an orientation of the camera within the 3D world space, wherein the provided orientation information is used for said transforming of the one or more of the identified locations within the 3D world space to a corresponding plurality of positions in a video coordinate system of the video image.

24. The apparatus of claim 23, wherein:
the one or more processors determine a current location of at least one of the first set of one or more sensors and use the current location to determine a location of a camera base, the orientation of the camera is in relation to the camera base.

25. The apparatus of claim 15, further comprising:
an inertial measurement system that provides information indicating an orientation of the camera, the one or more processors determine a current location of at least one of the first set of one or more sensors and use the current location to determine a location of the inertial measurement system, the one or more processors use the location of the inertial measurement system to determine a location of a camera base, the orientation of the camera is in relation to the camera base.

26. An apparatus for enhancing video, comprising:
a first set of one or more sensors configured to sense location within a three-dimensional (3D) world space and to provide corresponding 3D location information for a movable camera that is unrestrained in a local space;
a second set of one or more sensors configured to sense orientation within the 3D world space and to provide corresponding 3D orientation information for the camera, the first set of sensors and the second set of sensors are co-located with the camera on an aircraft;
a third set of one or more sensors configured to concurrently sense location within the 3D world space and to provide corresponding 3D object location information for multiple moving objects;
one or more communication stations in communication with the first set of one or more sensors, the second set of one or more sensors and the third set of one or more sensors; and
one or more processors in communication with the one or more communication stations, the one or more processors being configured to receive video from the camera, and to receive the 3D object location information for multiple moving objects; the one or more processors being configured to convert the received 3D object location information of the moving objects into positions in a video image from the camera based on the location information for the camera and the orientation information for the camera, the one or more processors being configured to create one or more graphics based on the positions in the video image and add the one or more graphics to the video image;
wherein the creating of the graphics includes:
identifying one or more locations within the 3D world space as being respectively related to the graphics; and
transforming one or more of the identified locations within the 3D world space to a corresponding plurality of positions in a video coordinate system of the video image.

* * * * *